US011433880B2

(12) United States Patent
Sakano et al.

(10) Patent No.: US 11,433,880 B2
(45) Date of Patent: Sep. 6, 2022

(54) IN-VEHICLE PROCESSING APPARATUS

(71) Applicant: Clarion Co., Ltd., Saitama (JP)

(72) Inventors: Morihiko Sakano, Tokyo (JP); Shinya Tagawa, Saitama (JP); Takehito Ogata, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 229 days.

(21) Appl. No.: 16/304,899

(22) PCT Filed: Jun. 2, 2017

(86) PCT No.: PCT/JP2017/020707
§ 371 (c)(1),
(2) Date: Nov. 27, 2018

(87) PCT Pub. No.: WO2018/003406
PCT Pub. Date: Jan. 4, 2018

(65) Prior Publication Data
US 2019/0291721 A1 Sep. 26, 2019

(30) Foreign Application Priority Data

Jun. 29, 2016 (JP) .............................. JP2016-128530

(51) Int. Cl.
*B60W 30/06* (2006.01)
*B62D 15/02* (2006.01)
(Continued)

(52) U.S. Cl.
CPC ............. *B60W 30/06* (2013.01); *B60R 21/00* (2013.01); *B62D 15/0285* (2013.01);
(Continued)

(58) Field of Classification Search
CPC ... B60W 30/06; B60W 2554/00; B60R 21/00; G08G 1/16; G01C 21/28; G01C 21/3602;
(Continued)

(56) References Cited

U.S. PATENT DOCUMENTS 6,321,158 B1 * 11/2001 DeLorme ............... G01C 21/26
340/995.16
8,886,387 B1 * 11/2014 Agarwal ............ G06K 9/00791
701/28
(Continued)

FOREIGN PATENT DOCUMENTS

CA        2 280 677 A1    2/2000
JP       2005-265494 A    9/2005
(Continued)

OTHER PUBLICATIONS

International Preliminary Report on Patentability (PCT/IB/338 & PCT/IB/373) issued in PCT Application No. PCT/JP2017/020707 dated Jan. 10, 2019, including English translation of document C2 (Japanese-language Written Opinion (PCT/ISA/237) previously filed on Nov. 27, 2018) (13 pages).
(Continued)

*Primary Examiner* — Nga X Nguyen
(74) *Attorney, Agent, or Firm* — Crowell & Moring LLP

(57) ABSTRACT

An in-vehicle processing apparatus is capable of performing position estimation resistant to disturbance. The in-vehicle processing apparatus includes: a storage unit that stores point cloud data including a plurality of coordinates of a point representing a portion of an object in a first coordinate system; a sensor input unit that acquires an output of a sensor that acquires information regarding vicinity of a vehicle; a movement information acquisition unit that acquires information related to movement of the vehicle; a local periphery information creation unit that generates local periphery information including a position of the vehicle in a second coordinate system and a plurality of coordinates of a point representing a portion of an object in the second coordinate system on the basis of information acquired by the sensor input unit and the movement information acquisition unit; and a position estimation unit that estimates a
(Continued)

relationship between the first coordinate system and the second coordinate system on the basis of the point cloud data and the local periphery information and then estimates the position of the vehicle in the first coordinate system.

7 Claims, 16 Drawing Sheets

(51) Int. Cl.
| | |
|---|---|
| *G06K 9/00* | (2022.01) |
| *G06T 7/70* | (2017.01) |
| *B60R 21/00* | (2006.01) |
| *G08G 1/16* | (2006.01) |
| *G01C 21/28* | (2006.01) |
| *G06V 20/58* | (2022.01) |
| *G06V 20/64* | (2022.01) |

(52) U.S. Cl.
CPC .............. *G01C 21/28* (2013.01); *G06T 7/70* (2017.01); *G06V 20/58* (2022.01); *G06V 20/64* (2022.01); *G08G 1/16* (2013.01); *B60W 2554/00* (2020.02)

(58) Field of Classification Search
CPC ...... G01C 21/30; G06T 7/70; B62D 15/0285; G06K 9/00201; G06K 9/00805; G05D 2201/0213; G05D 1/0274; G05D 1/0248
See application file for complete search history.

(56) References Cited

U.S. PATENT DOCUMENTS

| | | | |
|---|---|---|---|
| 9,062,979 B1 * | 6/2015 | Ferguson | .............. G01S 17/875 |
| 2007/0027597 A1 | 2/2007 | Breuel et al. | |
| 2013/0244611 A1 * | 9/2013 | Singhal | ................. H04W 76/50 |
| | | | 455/404.2 |
| 2014/0233010 A1 | 8/2014 | Baldwin et al. | |
| 2015/0331111 A1 | 11/2015 | Newman et al. | |

FOREIGN PATENT DOCUMENTS

| | | | |
|---|---|---|---|
| JP | 2005265494 A | * | 9/2005 |
| JP | 2006-72431 A | | 3/2006 |
| JP | 2006072431 A | * | 3/2006 |
| JP | 2007-183432 A | | 7/2007 |
| JP | 2007-534041 A | | 11/2007 |
| JP | 2010-70012 A | | 4/2010 |

OTHER PUBLICATIONS

International Search Report (PCT/ISA/210) issued in PCT Application No. PCT/JP2017/020707 dated Jul. 4, 2017 with English translation (four (4) pages).
Japanese-language Written Opinion (PCT/ISA/237) issued in PCT Application No. PCT/JP2017/020707 dated Jul. 4, 2017 (six (6) pages).
Partial Supplementary European Search Report issued in European Application No. 17819771.1 dated Feb. 3, 2020 (17 pages).
Pomerleau F. et al., "A Review of Point Cloud Registration Algorithms for Mobile Robotics", Foundations and Treads in Robotics, Jul. 21, 2015, pp. 1-104, XP55346892A (108 pages).
Costa C. et al., "11 Robust 3/6 Dof Self-Localization System with Selective Map Update for Mobile Robot Platforms", Robotics and Autonomous Systems, Oct. 8, 2015, pp. 113-140, vol. 76, XP029377882 (28 pages).
Chinese-language Office Action issued in Chinese Application No. 201780031226.X dated Nov. 3, 2021 with English translation (20 pages).
Extended European Search Report issued in European Application No. 17819771.1 dated Jun. 26, 2020 (14 pages).
Chinese-language Office Action issued in Chinese Application No. 201780031226.X dated Mar. 29, 2022 with English translation (21 pages).

* cited by examiner

FIG. 2

| | | 124A | | |
|---|---|---|---|---|
| | colspan="4" | LATITUDE: xxx, LONGITUDE: xxx | | |
| | | DESCRIPTION | X-COORDINATE | Y-COORDINATE |
| PARKING LOT 1 | PARKING REGION | VORTEX 1 | | |
| | | VORTEX 2 | | |
| | | VORTEX 3 | | |
| | | VORTEX 4 | | |
| | LANDMARK | 1 | | |
| | | 2 | | |
| | | 3 | | |
| | | . | | |
| | | . | | |
| | colspan="4" | LATITUDE: xxx, LONGITUDE: xxx | | |
| | | DESCRIPTION | X-COORDINATE | Y-COORDINATE |
| PARKING LOT 2 | PARKING REGION | VORTEX 1 | | |
| | | VORTEX 2 | | |
| | | VORTEX 3 | | |
| | | VORTEX 4 | | |
| | LANDMARK | 1 | | |
| | | 2 | | |
| | | 3 | | |
| | | . | | |
| | | . | | |

FIG. 8
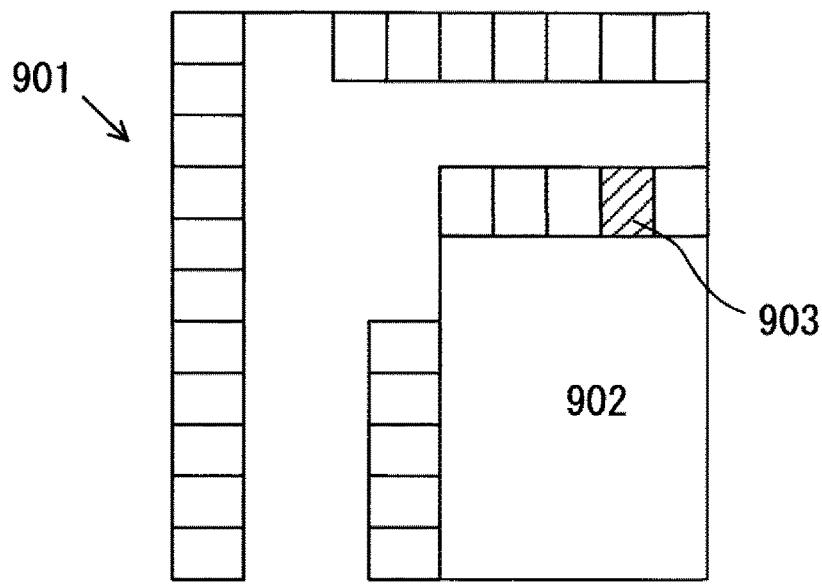
(a)
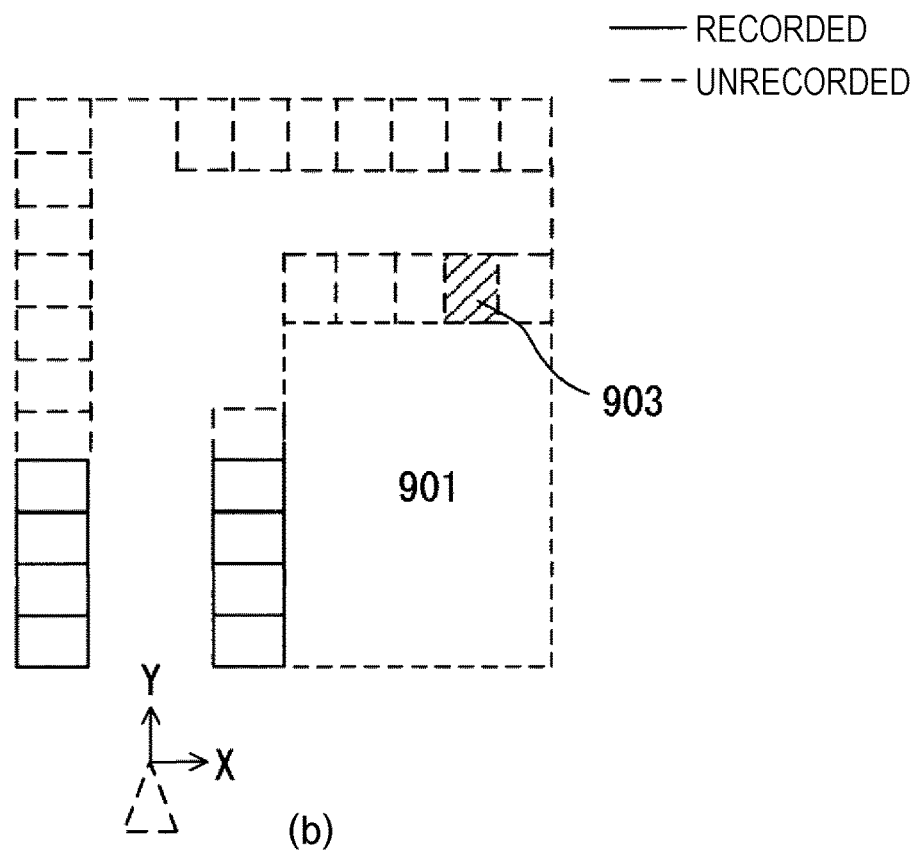
(b)

FIG. 9
— RECORDED
--- UNRECORDED
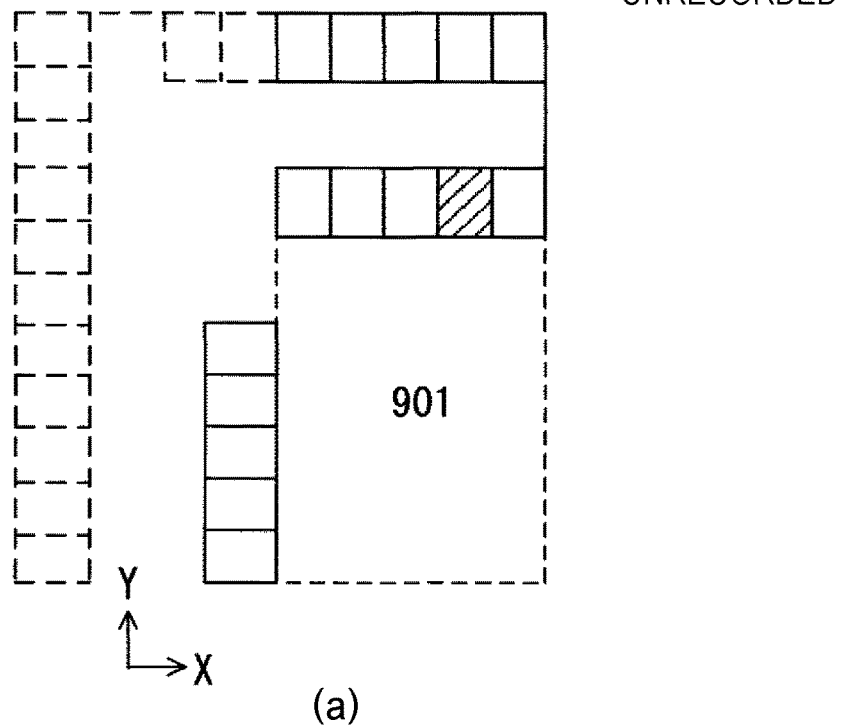
(a)
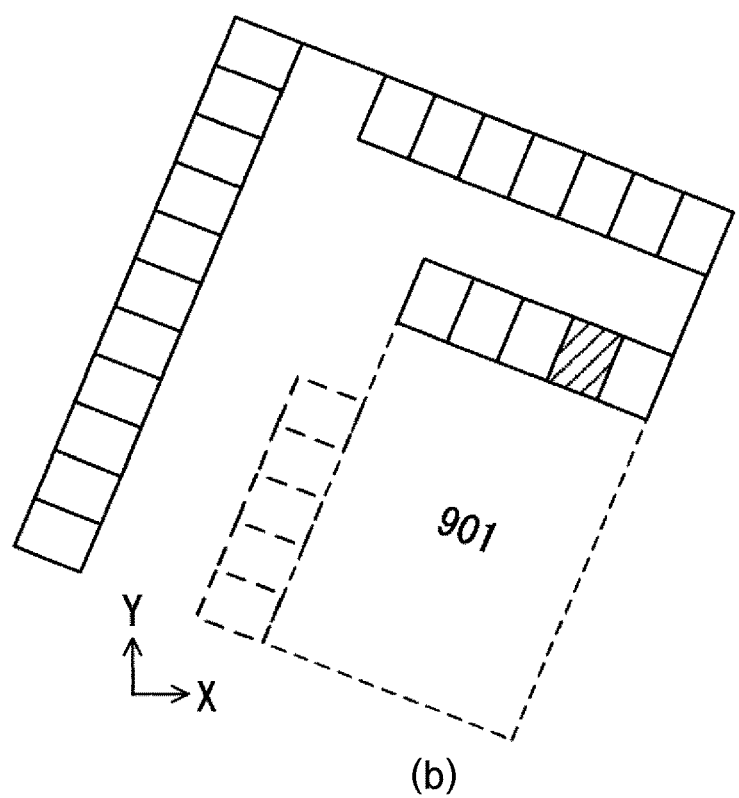
(b)

FIG. 10
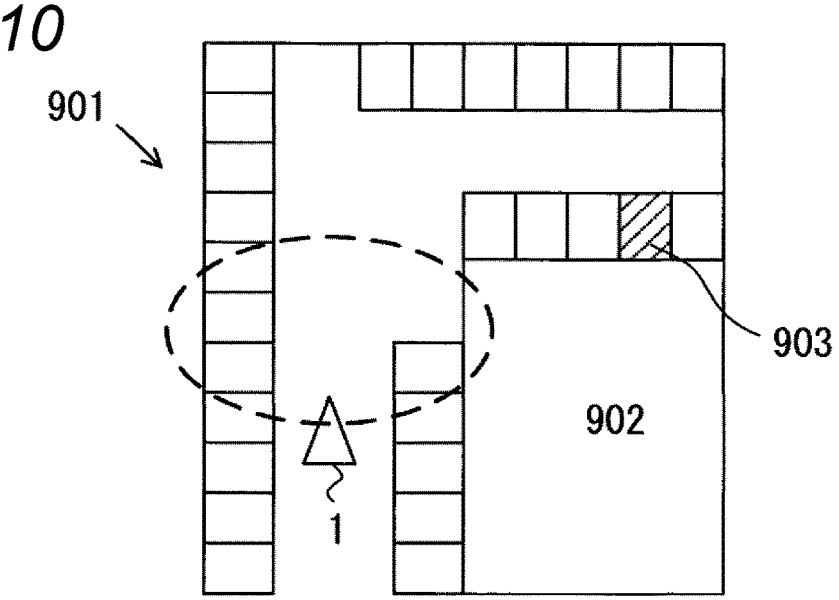
FIG. 11     --- LOCAL PERIPHERY INFORMATION
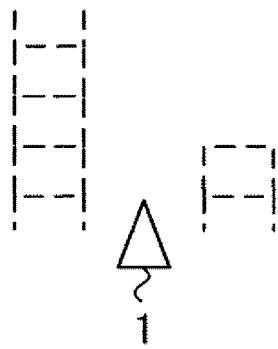
FIG. 12     ⎯⎯ PARKING LOT POINT CLOUD
            --- LOCAL PERIPHERY INFORMATION
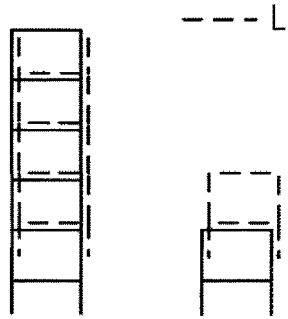

FIG. 13
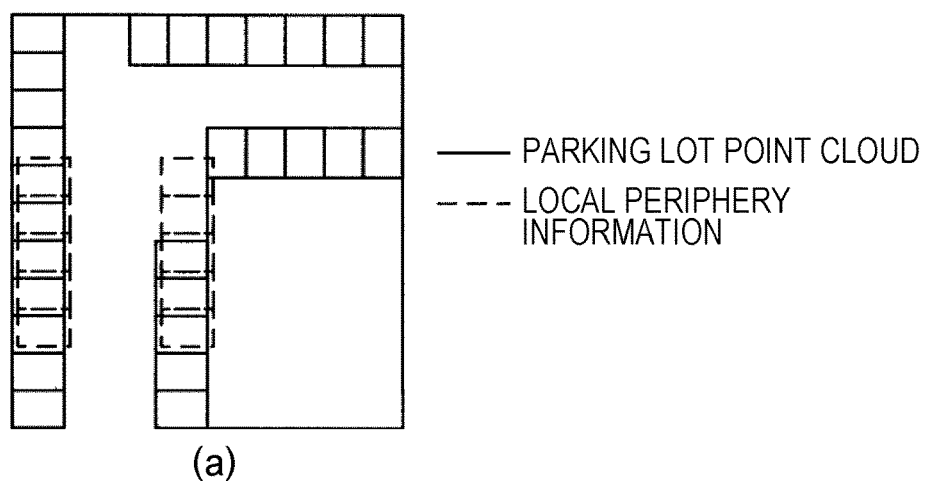
— PARKING LOT POINT CLOUD
--- LOCAL PERIPHERY INFORMATION
(a)
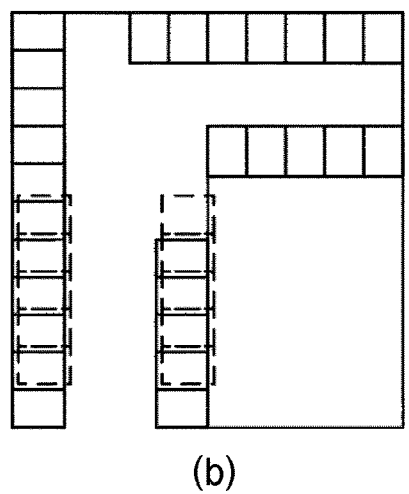
(b)
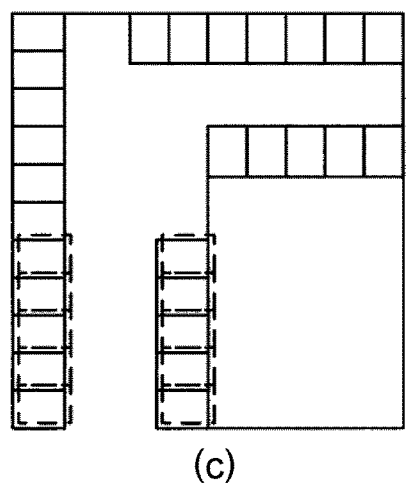
(c)

FIG. 16
— PARKING LOT POINT CLOUD
○ ○ ○ LOCAL PERIPHERY INFORMATION
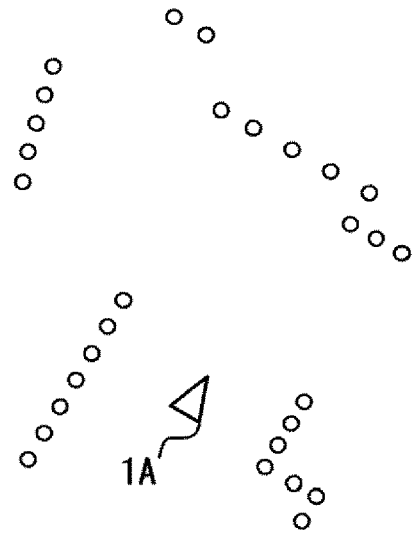
(a)
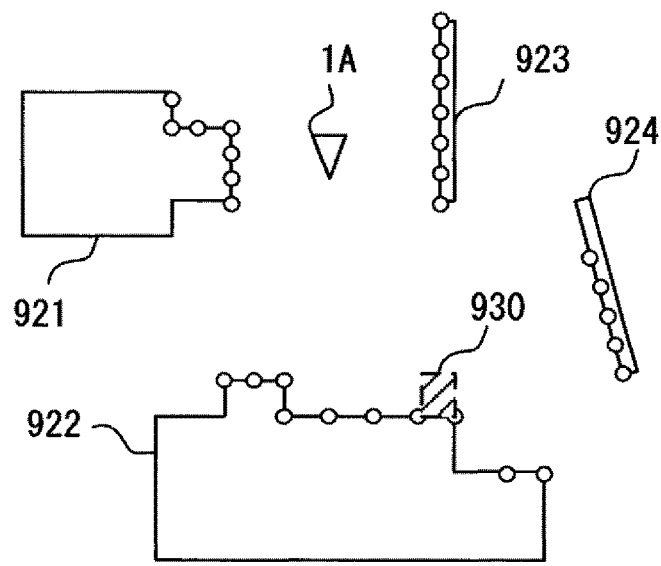
(b)

IN-VEHICLE PROCESSING APPARATUS

TECHNICAL FIELD

The present invention relates to an in-vehicle processing apparatus.

BACKGROUND ART

In recent years, activities for realizing automatic driving of automobiles are expanding. Automatic driving represents autonomous travel of a vehicle without user's operation, with the use of sensing of vehicle vicinity using an external sensor such as a camera, ultrasonic radar, and radar and with subsequent judgment on the basis of a result of the sensing. This automatic driving needs estimation of the position of the vehicle.

PTL 1 discloses an automatic traveling apparatus including: a position detection means that measures a position of a vehicle; an imaging means that images periphery of the vehicle and generates image data; a position calculation means that sets a search range of road components in the image data, processes the search range and calculates the position of the road components on the basis of position errors of the road components; an own-vehicle position correction means that corrects the vehicle position measured by the position detection means on the basis of the position of the road component calculated by the position calculation means; and a control command output means that outputs a control command for automatic travel based on the corrected vehicle position.

CITATION LIST

Patent Literature

PTL 1: JP 2007-183432 A

SUMMARY OF INVENTION

Technical Problem

While PTL 1 does not refer to disturbance, various types of disturbance exist in an outdoor environment, and thus, there is a demand for position estimation resistant to disturbance.

Solution to Problem

According to a first embodiment of the present invention, an in-vehicle processing apparatus includes: a storage unit that stores point cloud data including a plurality of coordinates of a point representing a portion of an object in a first coordinate system; a sensor input unit that acquires an output of a sensor that acquires information regarding vicinity of a vehicle; a movement information acquisition unit that acquires information related to movement of the vehicle; a local periphery information creation unit that generates local periphery information including a position of the vehicle in a second coordinate system and a plurality of coordinates of a point representing a portion of an object in the second coordinate system on the basis of information acquired by the sensor input unit and the movement information acquisition unit; and a position estimation unit that estimates a relationship between the first coordinate system and the second coordinate system on the basis of the point cloud data and the local periphery information and then estimates the position of the vehicle in the first coordinate system.

Advantageous Effects of Invention

According to the present invention, the in-vehicle processing apparatus can perform position estimation resistant to disturbance.

BRIEF DESCRIPTION OF DRAWINGS

FIG. 2 is a diagram illustrating an example of a parking lot point cloud 124A

FIG. 8A is a plan view illustrating an example of a parking lot 901.

FIG. 8B is a diagram visualizing a point cloud of landmarks stored in a RAM 122.

FIG. 9A is a diagram illustrating an example of visualizing the point cloud data of the parking lot point cloud 124A.

FIG. 9B is a diagram illustrating an example visualizing newly detected point cloud data.

FIG. 10 is a diagram illustrating a current position of a vehicle 1 in the parking lot 901.

FIG. 11 is a diagram illustrating data acquired by transforming a point cloud extracted from an image photographed at the position illustrated in FIG. 10 by the vehicle 1 into parking lot coordinates.

FIG. 12 is a diagram illustrating a comparison between the parking lot point cloud 124A and local periphery information 122B illustrated in FIG. 11 in a case where the position estimation of the vehicle 1 in the parking lot coordinate system includes an error.

FIGS. 13A to 13C are diagrams illustrating a relationship of the local periphery information 122B illustrated in FIGS. 13A-13C with respect to the parking lot point cloud 124A in a case where the local periphery information 122B is moved by an integer multiple of a width of a parking frame.

FIG. 16A is a diagram illustrating the local periphery information 122B in an operation example.

FIG. 16B is a diagram illustrating correspondence between the parking lot point cloud 124A and the local periphery information 122B.

DESCRIPTION OF EMBODIMENTS

First Embodiment

Hereinafter, an in-vehicle processing apparatus according to a first embodiment of the present invention will be described with reference to FIGS. 1 to 13.

Figure 1:
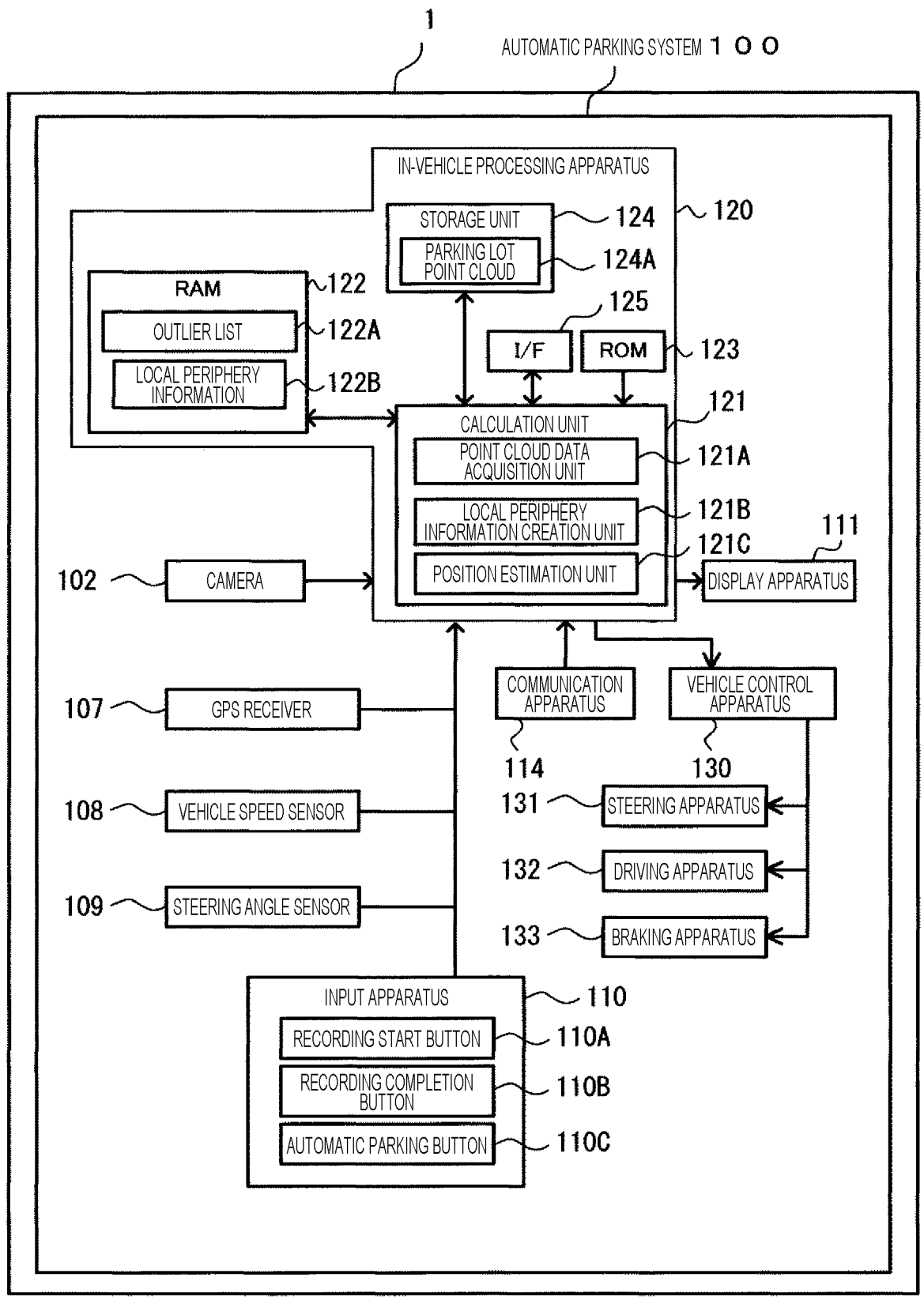
FIG. 1 is a configuration diagram of an automatic parking system 100.

FIG. 1 is a configuration diagram of an automatic parking system 100 including an in-vehicle processing apparatus according to the present invention. The automatic parking system 100 is mounted on a vehicle 1. The automatic parking system 100 includes sensor groups 102, 107 to 109, input/output apparatus groups 110, 111 and 114, control apparatus groups 130 to 133 for controlling the vehicle 1, and an in-vehicle processing apparatus 120. The sensor group, the input/output apparatus group, and the control apparatus group are connected to the in-vehicle processing apparatus 120 via signal lines, and exchange various data with the in-vehicle processing apparatus 120.

The in-vehicle processing apparatus 120 includes a calculation unit 121, a RAM 122, a ROM 123, a storage unit 124, and an interface 125. The calculation unit 121 is a CPU. It is also allowable to cause another calculation processing apparatus such as an FPGA to execute all or a part of calculation processing. The RAM 122 is a readable/writable storage region and operates as a main storage apparatus of the in-vehicle processing apparatus 120. The RAM 122 stores an outlier list 122A to be described below and local periphery information 122B to be described below. The ROM 123 is a read-only storage region and stores a program to be described below. This program is expanded in the RAM 122 and executed by the calculation unit 121. The calculation unit 121 reads and executes the program, so as to operate as a point cloud data acquisition unit 121A, a local periphery information creation unit 121B, and a position estimation unit 121C.

The storage unit 124 is a nonvolatile storage apparatus and operates as an auxiliary storage apparatus of the in-vehicle processing apparatus 120. The storage unit 124 stores a parking lot point cloud 124A. The parking lot point cloud 124A is one or more pieces of parking lot data. The parking lot data is a set of position information regarding a parking lot, that is, latitude/longitude, coordinates indicating a parking region and coordinates of points constituting a landmark existing in the parking lot. The landmark will be described below. The interface 125 exchanges information between the in-vehicle processing apparatus 120 and other devices constituting the automatic parking system 100.

The sensor group includes a camera 102 that photographs vicinity of the vehicle 1, a GPS receiver 107, a vehicle speed sensor 108, and a steering angle sensor 109.

The camera 102 outputs the image (hereinafter, photographed image) acquired by photographing to the in-vehicle processing apparatus 120. The in-vehicle processing apparatus 120 performs positioning of a landmark to be described below, using the image photographed by the camera 102. Internal parameters such as a focal length of the camera 102 and the size of the imaging element, and external parameters such as an attachment position and attachment attitude of the camera 102 to the vehicle 1 are known and stored beforehand in the ROM 123. The in-vehicle processing apparatus 120 can calculate a positional relationship between a subject and the camera 102 using the internal parameters and the external parameters stored in the ROM 123.

The GPS receiver 107 receives signals from a plurality of satellites constituting a satellite navigation system and calculates a position of the GPS receiver 107, that is, the latitude and longitude by calculation based on received signals. Note that the precision of the latitude and longitude calculated by the GPS receiver 107 need not be high, and may include an error of about several meters to 10 m, for example. The GPS receiver 107 outputs the calculated latitude and longitude to the in-vehicle processing apparatus 120.

The vehicle speed sensor 108 and the steering angle sensor 109 measure the vehicle speed and the steering angle of the vehicle 1, respectively, and individually output the measurement values to the in-vehicle processing apparatus 120. The in-vehicle processing apparatus 120 calculates the moving amount and the movement direction of the vehicle by using a known dead reckoning technique using the outputs of the vehicle speed sensor 108 and the steering angle sensor 109.

An operation command to the in-vehicle processing apparatus 120 from the user is input to the input apparatus 110. The input apparatus 110 includes a recording start button 110A, a recording completion button 110B, and an automatic parking button 110C. A display apparatus 111 is a liquid crystal display, for example, and displays information output from the in-vehicle processing apparatus 120. Note that the input apparatus 110 and the display apparatus 111 may be integrated as a liquid crystal display that responds to touch operation, for example. In this case, depression of the recording start button 110A, the recording completion button 110B, or the automatic parking button 110C may be judged when a touch on a predetermined region of the liquid crystal display is sensed.

The communication apparatus 114 is used for exchanging information wirelessly between a device outside the vehicle 1 and the in-vehicle processing apparatus 120. For example, when the user is outside the vehicle 1, the communication apparatus 114 communicates with a portable terminal worn by the user to exchange information. Targets with which the communication apparatus 114 communicates are not limited to portable terminals of the user.

A vehicle control apparatus 130 controls a steering apparatus 131, a driving apparatus 132, and a braking apparatus 133 on the basis of an operation command from the in-vehicle processing apparatus 120. The steering apparatus 131 operates steering of the vehicle 1. The driving apparatus 132 applies driving force to the vehicle 1. For example, the driving apparatus 132 increases the target rotation speed of an engine of the vehicle 1 to increase the driving force of the vehicle 1. The braking apparatus 133 applies braking force to the vehicle 1.

Landmark Positioning

A landmark is an object having a feature that can be identified by a sensor, such as a parking frame line as one type of road surface paint and a wall of a building, being an obstacle to hinder traveling of the vehicle. In the present embodiment, vehicles or humans as moving bodies are not included in landmarks. The in-vehicle processing apparatus 120 detects a landmark existing in the periphery of the vehicle 1, that is, a point having a feature that can be identified by a sensor on the basis of the information input from the camera 102. Hereinafter, detection of a landmark based on information input from the external sensor, that is, the camera 102, will be referred to as "landmark positioning".

The in-vehicle processing apparatus 120 applies an image recognition program as described below to the photographed image of the camera 102 so as to detect a road surface paint such as a parking frame. To detect a parking frame, an edge is first extracted from the input image using a Sobel filter or the like. Next, for example, a pair of a rising edge being a portion changing from white to black and a falling edge being a portion changing from black to white is extracted. This pair is determined as a candidate for a parking frame in a case where an interval between the pair is substantially in agreement with a first predetermined distance, that is, a thickness of a white line constituting the parking frame. Similar processing is used to detect a plurality of candidate parking frames, and in a case where an interval between candidate parking frames is substantially in agreement with a second predetermined distance, that is, an interval between white lines of the parking frame, the candidates are detected as parking frames. The road surface paint other than the parking frame is detected by an image recognition program to execute the following processing. First, an edge is extracted from an input image with a Sobel filter or the like. Detection of the paint is possible with searching for a pixel having edge intensity higher than a predetermined value and the interval between the edges is a predetermined distance corresponding to the width of the white line.

The in-vehicle processing apparatus 120 uses known template matching, for example, to detect vehicles and humans and excludes them from the measurement results. Furthermore, it is allowable to exclude a detected moving body from the measurement result as follows. That is, the in-vehicle processing apparatus 120 calculates a positional relationship between the subject and the camera 102 in the photographed image using the internal parameters and the external parameters. Next, the in-vehicle processing apparatus 120 tracks the subject in the photographed image continuously acquired by the camera 102 to calculate relative speed between the vehicle 1 and the subject. Finally, the in-vehicle processing apparatus 120 uses the outputs of the vehicle speed sensor 108 and the steering angle sensor 109 to calculate the speed of the vehicle 1. In a case where the speed of the vehicle 1 is not in agreement with the relative speed with the subject, the in-vehicle processing apparatus 120 judges that the subject is a moving body and excludes information related to this moving body from the measurement result.

Parking Lot Point Cloud 124A

FIG. 2 is a diagram illustrating an example of the parking lot point cloud 124A stored in the storage unit 124. FIG. 2 illustrates an example in which two pieces of parking lot data are stored as the parking lot point cloud 124A. One piece of the parking lot data includes the position of the parking lot, that is, the latitude and longitude (hereinafter referred to as latitude/longitude), the coordinates of the parking region, and the coordinates of the points constituting the landmark, on a two-dimensional plane. The position of the parking lot is represented by, for example, a position near an entrance of the parking lot, a position near the center of the parking lot, or the latitude/longitude of the parking position. The coordinates of the parking region and the coordinates of the points constituting a landmark are coordinates in a coordinate system unique to the parking lot data. Hereinafter, the coordinate system in parking lot data will be referred to as a "parking lot coordinate system". For example, in the parking lot coordinate system, coordinates of the vehicle 1 at the start of recording are defined as an origin, a traveling direction of the vehicle 1 at the start of recording is defined as a Y axis, and a rightward direction of the vehicle 1 at the start of recording is defined as an X axis. The coordinates of the parking region are recorded as coordinates of four vertices of the rectangular region when the parking region is rectangular, for example. The parking region, however, is not limited to a rectangle, and may be a polygon other than a rectangle, or an elliptical shape.

Outlier List 122A

An outlier list 122A stores information regarding points of the local periphery information 122B to be excluded from processing by the in-vehicle processing apparatus 120. The outlier list 122A is appropriately updated by the in-vehicle processing apparatus 120 as described below.

Local Periphery Information 122B

The local periphery information 122B stores coordinates of points constituting a landmark detected by the in-vehicle processing apparatus 120 in an automatic parking phase to be described below. Coordinates are based on the position and attitude of the vehicle 1 at the start of the recording of the local periphery information 122B so as to form a coordinate system defining the position as the origin, the traveling direction of the vehicle 1 as the Y axis, and the rightward in the traveling direction as the X axis. Hereinafter, this coordinate system will be referred to as a "local coordinate system".

Overview of Operation of In-Vehicle Processing Apparatus 120

The in-vehicle processing apparatus 120 mainly includes two operation phases, namely, a recording phase and an automatic parking phase. The in-vehicle processing apparatus 120 operates in the automatic parking phase unless there is a special instruction from the user. That is, the recording phase is started by the user's instruction.

In the recording phase, the vehicle 1 is operated by the user, and the in-vehicle processing apparatus 120 collects parking lot data, that is, information related to a white line and an obstacle present in the parking lot, and information regarding a parking position on the basis of information from sensors provided in the vehicle 1. The in-vehicle processing apparatus 120 stores the collected information in the storage unit 124 as a parking lot point cloud 124A.

In the automatic parking phase, the vehicle 1 is controlled by the in-vehicle processing apparatus 120, and the vehicle 1 is controlled to be parked at a predetermined parking position on the basis of the information from the parking lot point cloud 124A stored in the storage unit 124 and the sensors of the vehicle 1. The in-vehicle processing apparatus 120 detects a white line or an obstacle existing in the vicinity of the vehicle 1 on the basis of information from the sensor and verifies the positions with the parking lot point cloud 124A to estimate a current position. That is, the in-vehicle processing apparatus 120 estimates the current position of the vehicle in the parking lot coordinate system without using information acquired from the GPS receiver 107. The recording phase and the automatic parking phase will be described in detail below.

Recording Phase

The user presses the recording start button 110A near the entrance of the parking lot and causes the in-vehicle processing apparatus 120 to start operation of the recording phase. Thereafter, the user drives the vehicle 1 to the parking position on one's own, presses the recording completion button 110B after stopping the vehicle, so as to finish the operation of the recording phase in the in-vehicle processing apparatus 120.

In response to user's depression of the recording start button 110A, the in-vehicle processing apparatus 120 starts recording phase operation, and finishes the recording phase operation in response to user's depression of the recording completion button 110B. The recording phase operation of the in-vehicle processing apparatus 120 is divided into two, namely, extraction of a point cloud constituting a landmark, and recording of an extracted point cloud.

Processing of extracting a point cloud executed by the in-vehicle processing apparatus 120 will be described.

In response to user's depression of the recording start button 110A, the in-vehicle processing apparatus 120 reserves a temporary recording region in the RAM 122. Then, the in-vehicle processing apparatus 120 repeats the following processing until depression of the recording completion button 110B. That is, the in-vehicle processing apparatus 120 extracts a point cloud constituting the landmark on the basis of images photographed by the camera 102. Moreover, on the basis of the outputs of the vehicle speed sensor 108 and the steering angle sensor 109, the in-vehicle processing apparatus 120 calculates the moving amount and the movement direction of the vehicle 1 from the previous photographing session until the current photographing session using the camera 102. The in-vehicle processing apparatus 120 then records, in the RAM 122, the point cloud extracted on the basis of the positional relationship with the vehicle 1, and the moving amount and movement direction of the vehicle 1. The in-vehicle processing apparatus 120 repeats this processing.

The position of the vehicle 1 and the coordinates of the point cloud are recorded as coordinate values in the recording coordinate system. "Recording coordinate system" treats a value as a coordinate value in a coordinate system in which, for example, the position of the vehicle 1 at the start of recording is defined as origin (0, 0), the traveling direction (attitude) of the vehicle 1 at the start of recording is defined as the Y axis, and the rightward direction of the vehicle 1 at the time of starting recording as the X axis. Therefore, different recording coordinate systems are set depending on the position and attitude of the vehicle 1 at the time of starting recording even when the point cloud is recorded in a same parking lot, leading to recording of the point clouds constituting the landmark at different coordinates.

The user parks the vehicle at the target parking position and operates the recording completion button 110B. In response to depression of the recording completion button 110B, the in-vehicle processing apparatus 120 records the current position as a parking position in the RAM 122. The parking position is recorded as coordinates of four corners of a rectangle acquired as approximation of the vehicle 1, for example. Furthermore, the in-vehicle processing apparatus 120 records the latitude/longitude output from the GPS receiver 107 together, as the coordinates of the parking lot. Next, the in-vehicle processing apparatus 120 performs a point cloud recording processing as follows. Alternatively, however, it is also allowable to record latitude/longitude output from the GPS receiver 107 at the time of depression of the recording start button 110A, as the coordinates of the parking lot.

The in-vehicle processing apparatus 120 judges whether the coordinates of the parking lot recorded with operation of the recording completion button 110B, namely, the latitude/longitude, is substantially in agreement with the coordinates of any of the parking lots recorded in the parking lot point cloud 124A. In a case where substantial agreement is not obtained, the in-vehicle processing apparatus 120 records the information related to the point cloud stored in the RAM 122 in the parking lot point cloud 124A as new parking lot data. In a case where substantial agreement is obtained, the in-vehicle processing apparatus 120 judges whether to merge the information regarding the point cloud having substantially in agreement with parking lot coordinates as a point cloud of one parking lot. For this judgment, the in-vehicle processing apparatus 120 first performs coordinate transformation to achieve agreement between the parking position included in the parking lot data and the parking position recorded in the RAM, and then calculates a point cloud agreement level as an agreement level between the point cloud of the parking lot point cloud 124A and the point cloud stored in the RAM 122. Then, the in-vehicle processing apparatus 120 judges that both are going to be integrated when the calculated point cloud agreement level is higher than a threshold, and judges that they are not going to be integrated when the level is the threshold or below. The calculation of the point cloud agreement level will be described below.

In a case where judgment is not integrating, the in-vehicle processing apparatus 120 records the point cloud stored in the RAM 122 as new parking lot data in the parking lot point cloud 124A. In a case where judgment is integrating, the in-vehicle processing apparatus 120 adds the point cloud stored in the RAM 122 to the existing parking lot data of the parking lot point cloud 124A.

Flowchart of Recording Phase

Figure 3:
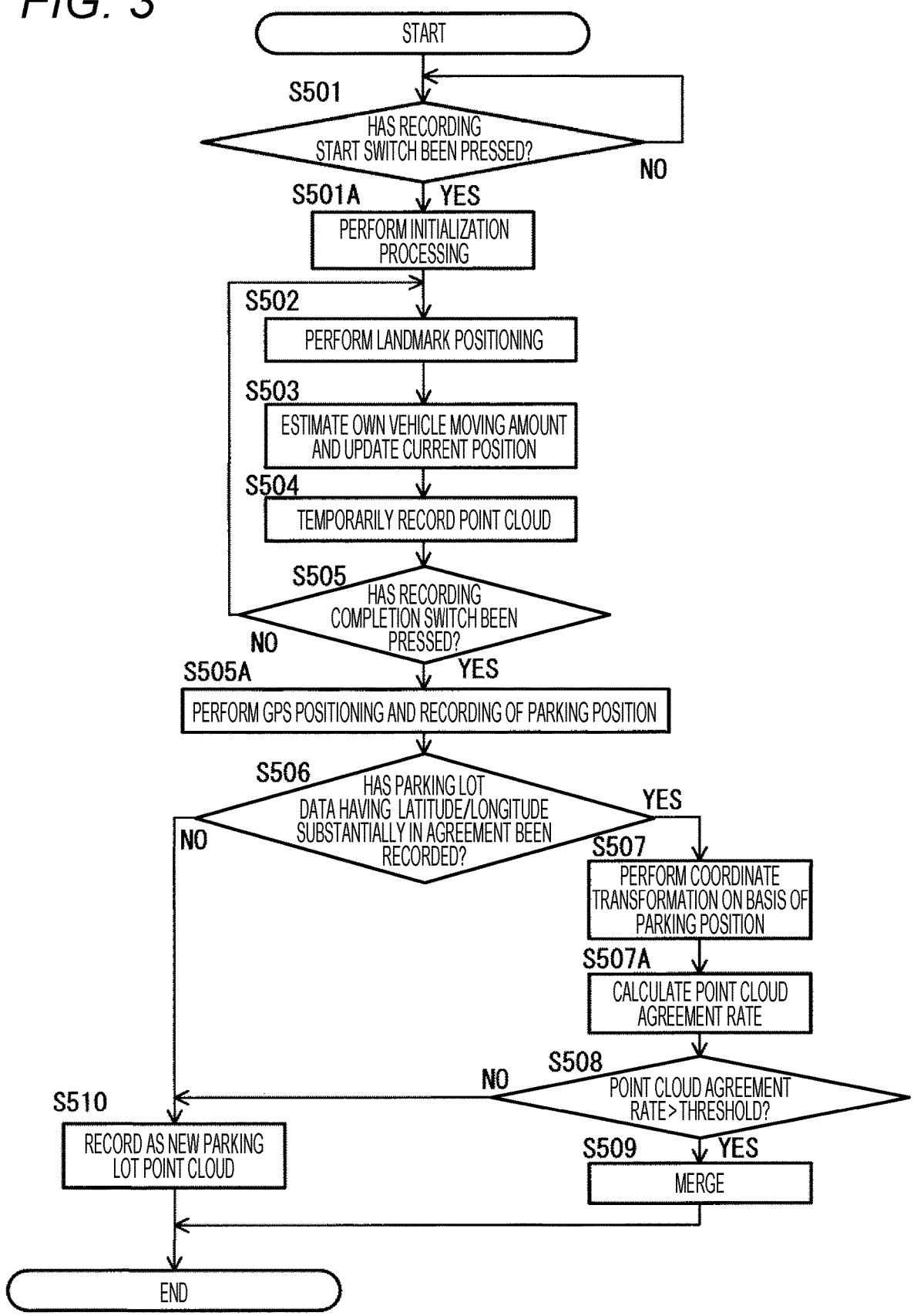
FIG. 3 is a flowchart illustrating operation in a recording phase of an in-vehicle processing apparatus 120.

FIG. 3 is a flowchart illustrating operation in the recording phase of the in-vehicle processing apparatus 120. The execution subject of individual steps described below is the calculation unit 121 of the in-vehicle processing apparatus 120. The calculation unit 121 functions as the point cloud data acquisition unit 121A in execution of processing illustrated in FIG. 3.

Step S501 judges whether the recording start button 110A has been pressed. In a case where it is judged that the recording start button 110A has been pressed, the processing proceeds to step S501A. In a case where it is judged that the recording start button 110A has not been pressed, the processing remains at step S501. Step S501A reserves a new recording region in the RAM 122. This storage region stores the extracted point cloud and the current position of the vehicle 1 using the coordinates in the above-described recording coordinate system.

In step S502, information is acquired from the sensor group to execute the above-described landmark positioning, that is, extraction of a point cloud constituting a landmark using images photographed by the camera 102. The subsequent step S503 estimates the moving amount of the vehicle 1 in the time period from the previous photographing session performed by the camera 102 until the most recent photographing session, and updates the current position of the vehicle 1 in the recording coordinate system recorded in the RAM 122. The moving amount of the vehicle 1 can be estimated by a plurality of means. For example, the moving amount of the vehicle 1 can be estimated from a positional change of the subject present on a road surface in the image photographed by the camera 102 as described above. Alternatively, when a highly accurate GPS receiver with small error is installed as the GPS receiver 107, an output from this GPS receiver may be used. Next, the processing proceeds to step S504.

In step S504, the point cloud extracted in step S502 is stored in the RAM 122 as the coordinates in the recording coordinate system on the basis of the current position updated in step S503. The subsequent step S505 judges whether the recording completion button 110B has been pressed. In a case where it is judged that the recording completion button 110B has been pressed, the processing proceeds to step S505A. In a case where it is judged that the recording completion button 110B has not been pressed, the processing returns to step 5502. Step S505A acquires the current latitude/longitude of the vehicle 1 from the GPS receiver 107 and records the parking position, that is, the current position of the vehicle 1 represented by the coordinates of the four corners of the vehicle 1 in the recording coordinate system. Next, the processing proceeds to step S506.

Step S506 judges whether parking lot data having latitude/longitude substantially in agreement with the current latitude/longitude of the vehicle 1 acquired in step S505A is recorded in the parking lot point cloud 124A.

In a case where it is judged that the current latitude/longitude of the vehicle 1 substantially in agreement with the latitude/longitude of any of the parking lot data recorded in the parking lot point cloud 124A, the processing proceeds to step S507. Otherwise, the processing proceeds to step S510. Hereinafter, the parking lot data of the parking lot point cloud 124A judged to have latitude/longitude substantially in agreement with the current latitude/longitude of the vehicle 1 will be referred to as target parking lot data.

Step S507 transforms the recording coordinate system being the coordinate system of the point cloud data stored in the RAM 122 into a coordinate system of the point cloud data of the target parking lot data, using the parking position as a reference. That is, this step derives a coordinate transformation formula for the recording coordinate system and the parking lot coordinate system to achieve agreement between the parking position included in the target parking lot data and the parking position recorded at step S505A. Using the coordinate transformation formula, the coordinates of the points constituting the landmark stored with the recording coordinate system in the RAM 122 are transformed into the parking lot coordinate system of the target parking lot data.

The subsequent step S507A calculates a point cloud agreement rate IB of the point cloud data stored in the RAM 122 and the target parking lot data. The point cloud agreement rate IB is calculated by the following Formula 1.

$$IB=2*Din/(D1+D2) \quad \text{Formula 1}$$

In the Formula 1, "Din" is the number of points having a predetermined distance range between each of the points in the cloud data coordinate-transformed in step S507 and each of the points in the point cloud data of the target parking lot data. In Formula 1, "D1" is the number of points in the point cloud data stored in the RAM 122, and "D2" is the number of points in the point cloud data of the target parking lot data. Next, the processing proceeds to step S508.

Step S508 judges whether the point cloud agreement rate calculated in step S507A is higher than a predetermined threshold. In a case where the rate is judged to be higher than the threshold, the processing proceeds to step S509, and in a case where the rate is judged to be the threshold or below, the processing proceeds to step S510.

Step S509 executes merging processing, that is, adds the point cloud data coordinate-transformed in step S507 to the target parking lot data of the parking lot point cloud 124A stored in the storage unit 124. Step S510 is a step to be executed in a case where a negative judgment is made in step S506 or step S508, and executes recording of the point cloud data saved in the RAM 122, the latitude/longitude and the parking position of the vehicle 1 recorded in step S505A, as new parking lot data in the parking lot point cloud 124A. This concludes the flowchart of FIG. 3.

Automatic Parking Phase

When the user drives the vehicle 1 to a position near any of the parking lots recorded in the parking lot point cloud 124A, a message indicating that automatic parking is possible is displayed on the display apparatus 111. In response to user's depression of the automatic parking button 110C at this time, automatic parking processing by the in-vehicle processing apparatus 120 is started.

Operation of the in-vehicle processing apparatus 120 will be described below with reference to a flowchart.

Overall Flow of Automatic Parking Processing

Figure 4:
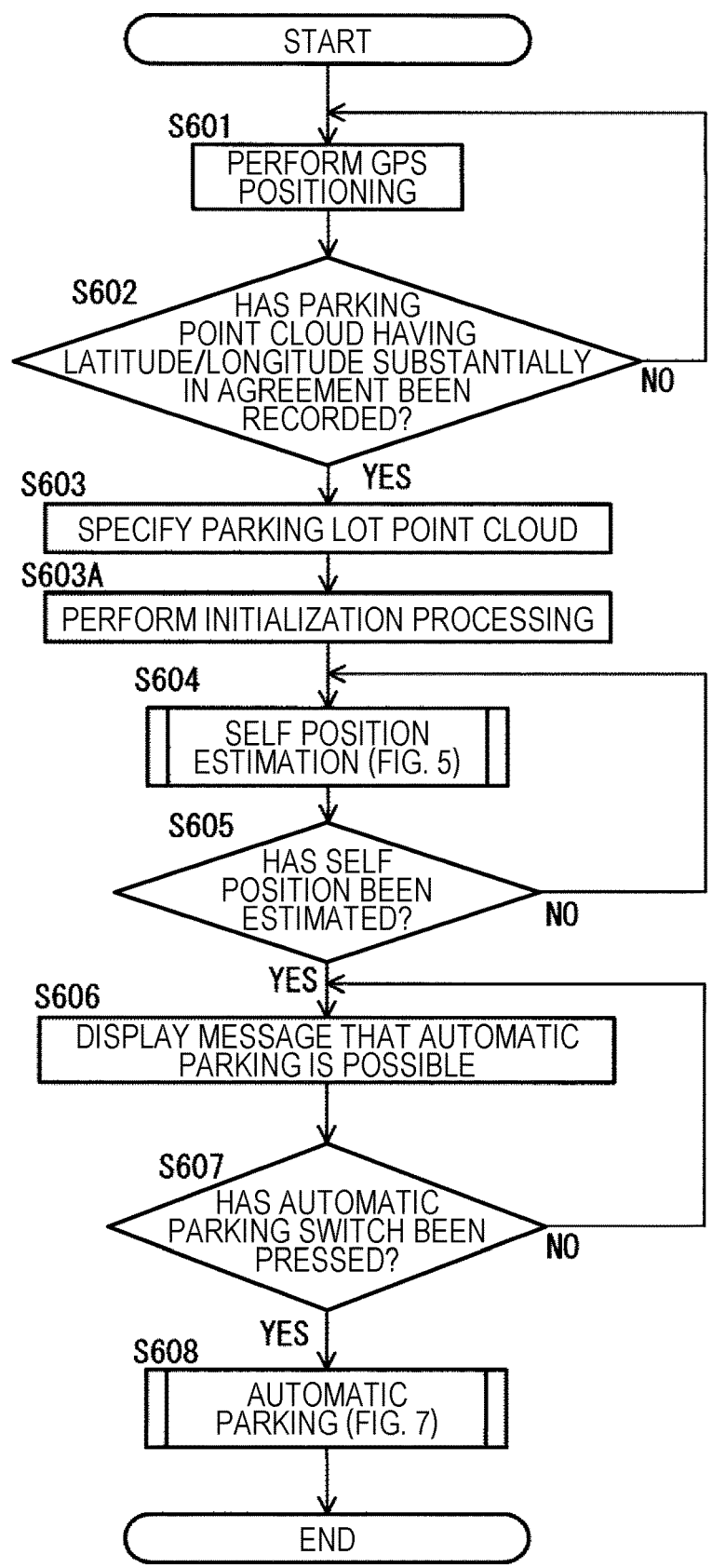
FIG. 4 is a flowchart illustrating overall operation of an automatic parking phase of the in-vehicle processing apparatus 120.

FIG. 4 is a flowchart illustrating overall operation of the automatic parking phase of the in-vehicle processing apparatus 120. The execution subject of individual steps described below is the calculation unit 121 of the in-vehicle processing apparatus 120.

The in-vehicle processing apparatus 120 firstly performs positioning of current latitude/longitude using the GPS receiver 107 (step S601), and determines whether the current latitude/longitude substantially in agreement with the latitude/longitude of any of the parking lot data of the parking lot point cloud 124A. In other words, the presence/absence of a parking lot existing within a predetermined distance from the position of the vehicle 1 is judged (step S602). In a case where it is judged that the latitude/longitude of any of the parking lot data substantially in agreement with the latitude/longitude of the vehicle 1, the processing proceeds to step S603. In a case where no agreement is achieved with the latitude/longitude of any of the parking lot data, the processing returns to step S601. Note that in the case of returning to step S601, there is a possibility that an affirmative judgment might be made in step S602 due to the movement of the vehicle 1 by the user's driving.

Then, the in-vehicle processing apparatus 120 specifies parking lot data having latitude/longitude substantially in agreement with the current position of the vehicle 1 among the plurality of pieces of parking lot data included in the parking lot point cloud 124A (step S603). Next, the in-vehicle processing apparatus 120 initializes the local periphery information 122B stored in the RAM 122 and initializes the current position of the vehicle 1 stored in the RAM 122, as initialization processing. Specifically, previously recorded information, if any, is removed and a new coordinate system is set. In the present embodiment, this coordinate system is referred to as a local coordinate system. This local coordinate system is set on the basis of the position and attitude of the vehicle 1 at execution of step S603A. For example, a position of the vehicle 1 at execution of step S603A is set as an origin of the local coordinate system, and the X axis and the Y axis are set according to the orientation of the vehicle 1 at execution of the step S603A. In addition, the current position of the vehicle 1 is set to the origin (0, 0) in initialization of the current position of the vehicle 1.

Figure 5:
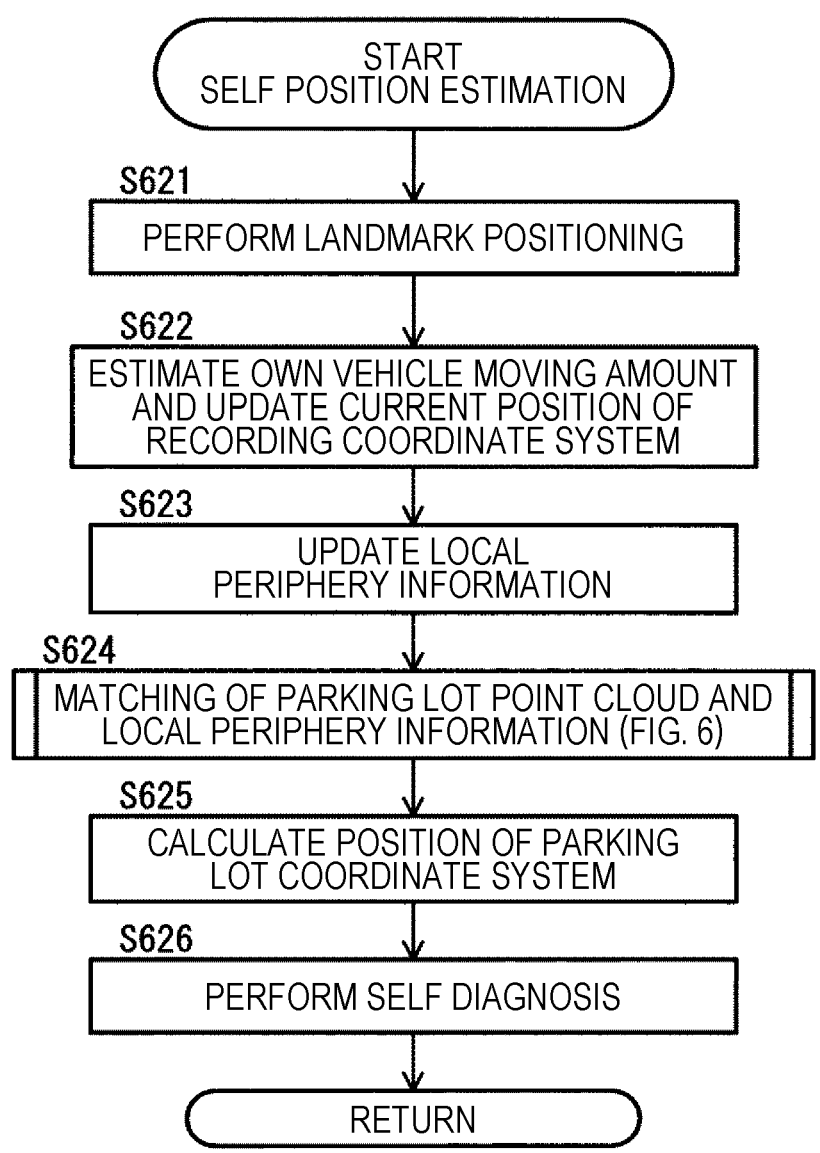
FIG. 5 is a flowchart illustrating self position estimation processing in the automatic parking phase.

Next, self position estimation is performed, that is, the position of the vehicle 1 in the parking lot coordinate system is estimated with a procedure illustrated in FIG. 5 (step S604). Step S605 judges whether the self position estimation is successful. In a case where estimation is judged to be successful, the processing proceeds to step S606. In a case where estimation is judged to be a failure, the processing returns to step S604.

In step S606, the in-vehicle processing apparatus 120 displays a message indicating on the display apparatus 111 that automatic parking is possible, and judges in the subsequent step S607 whether the automatic parking button 110C has been pressed by the user. In a case where it is judged that the automatic parking button 110C has been pressed, the processing proceeds to step S608, and the automatic parking processing is executed with the procedure illustrated in FIG. 7. In a case where it is judged that the automatic parking button 110C has not been pressed, the processing returns to step S606.

With reference to FIG. 5, the self position estimation processing executed in step S604 of FIG. 4 will be described in detail. The calculation unit 121 functions as the local periphery information creation unit 121B in execution of processing illustrated in steps S621 to S623 of FIG. 5.

The landmark positioning in step S621, the estimation of the own vehicle moving amount in step S622, and the recording of the local periphery information 122B in step S623 are substantially the same as the processing in steps S502 to S504 in FIG. 2, respectively. The difference is that the data stored in the RAM 122 is recorded as local periphery information 122B. Upon completion of the execution of step S623, the in-vehicle processing apparatus 120 performs matching processing illustrated in detail in FIG. 6 (step S624). This matching processing acquires a correspondence relationship between the parking lot coordinate system and the local coordinate system, that is, the coordinate transformation formula for the parking lot coordinate system and the local coordinate system. In the subsequent step S625, the in-vehicle processing apparatus 120 uses the coordinates of the vehicle 1 in the local coordinate system updated in step S622 and the coordinate transformation formula acquired in step S625 to calculate the coordinates of the vehicle 1 in the parking lot coordinate system, namely, the self position of the vehicle 1. Next, the processing proceeds to step S626.

In step S626, the in-vehicle processing apparatus 120 executes self diagnosis of judging reliability of the position calculated in step S625. Self diagnosis is judged using the following three indices, for example.

With a first index, the moving amount of the vehicle 1 estimated by the known dead reckoning technique using the outputs of the vehicle speed sensor 108 and the steering angle sensor 109 is compared with the moving amount in a predetermined period estimated by self position estimation. In a case where the difference is larger than a predetermined threshold, reliability is judged to be low.

With a second index, judgment is made on the basis of an amount of error of the corresponding point calculated at the time of matching. In a case where the amount of error is larger than the predetermined threshold, the reliability is judged to be low.

With a third index, it is determined whether there is a similar solution. In a case where a similar solution is searched for using translation by a width of the parking frame from the acquired solution, for example, reliability is judged to be low in a case where there are about the same number of points with corresponding point errors within a certain range. Self position estimation is judged to be successful in a case where no low reliability judgment has been made with all of these three indices.

Details of the matching processing to be executed in step S624 of FIG. 5 will be described with reference to FIG. 6. The calculation unit 121 functions as the position estimation unit 121C in execution of processing illustrated in FIG. 6.

In step S641, the outlier list 122A stored in the RAM 122 is applied to the local periphery information 122B, and the point described in the outlier list 122A among the point cloud included in the local periphery information 122B is temporarily excluded from processing. A range of application of this would be steps S642 to S653, and step S654 includes points previously included in the outlier list 122A would also be an application target. However, since the steps S641 to S643 are unexecutable at first execution of the flowchart illustrated in FIG. 6, the execution is started from step S650. Next, the processing proceeds to step S641A.

In step S641A, the coordinates of the point cloud detected from the most recent photographed image, that is, the coordinates of the point cloud constituting the landmark detected in step S621 in FIG. 5 are transformed into coordinates in the parking lot coordinate system. This transformation is achieved by using the position of the vehicle 1 in the local coordinate system updated in step S622 and the coordinate transformation formula from the previously calculated local coordinate system to the parking lot coordinate system.

In the subsequent step S642, the instantaneous agreement level IC is calculated. The instantaneous agreement level IC is calculated by the following Formula 2.

$$IC = DIin/DIall \qquad \text{Formula 2}$$

In Formula 2, "DIin" is the number of points having a distance to a point constituting the nearest parking lot point cloud 124A that is a predetermined threshold or below among the point clouds detected from the most recent photographed image transformed into the parking lot coordinate system in step S641A. Moreover, in Formula 2, "DIall" is the number of point clouds detected in step S621. Next, the processing proceeds to step S643.

In step S643, it is judged whether the instantaneous agreement level IC calculated in step S642 is higher than the threshold. In a case where it is judged that the instantaneous agreement level IC is higher than the threshold, the processing proceeds to step S650. In a case where it is judged that the instantaneous agreement level IC is the threshold or below, the processing proceeds to step S644.

Step S644 detects a periodic feature, for example, a plurality of parking frames arranged side by side from the parking lot data as target for the parking lot point cloud 124A, that is, the point cloud data. As described above, the point cloud included in the parking lot point cloud is acquired in extraction of an edge, etc. of an image, making it possible to detect the parking frame line from the points arranged at an interval corresponding to the thickness of the white line. The subsequent step S645 judges whether a periodic feature has been detected in step S644. In a case where the periodic feature is judged to have been detected, the processing proceeds to step S646. In a case where the periodic feature is judged to have not been detected, the processing proceeds to step S650. Step S646 calculate a period of the periodic feature, for example, the width of the parking frame. The width of the parking frame referred to here is an interval between white lines constituting the parking frame. Next, the processing proceeds to step S647.

In step S647, the coordinate transformation formula calculated in the preceding step S653 is used as a reference, and this coordinate transformation formula is varied in a plurality of manners to calculate the overall agreement level IW individually. The coordinate transformation formula is varied in a plurality of manners so as to be shifted by an integer multiple of the periodic feature detected by the parking lot point cloud. The overall agreement level IW is calculated by the following Formula 3.

$$IW = DWin/DWall \quad \text{Equation} \qquad \text{Formula 3}$$

In Formula 3, "DWin" is the number points on which the distance to the point constituting the nearest parking lot point cloud 124A is a predetermined threshold or below among the points acquired by transforming the point constituting the local periphery information 122B into the parking lot coordinate system using the above-described coordinate transformation formula. In the Formula 2, "DWall" is the number of points detected in step S621. Next, the processing proceeds to step S648.

Step S648 stores a coordinate transformation formula that gives the maximum overall agreement level IW among the plurality of overall agreement levels IW calculated in step S647 in the RAM 122, and the processing proceeds to step S650.

Association processing in step S650, error minimization processing in step S651, and convergence determination processing in step S625 can use an iterative closest point (ICP) algorithm being a known point cloud matching technique. However, setting of an initial value in step S650 is peculiar to the present embodiment and will be described in detail, and other settings will be described briefly.

Step S650 is executed in a case where an affirmative determination is made in step S643, in a case where a negative determination is made in step S645, in a case where execution of step S648 is finished, or in a case where a negative determination is made in step S652. This step S650 calculates correspondence between the point cloud included in the parking lot data of the parking lot point cloud 124A and the point cloud included in the local periphery information 122B. In the case where step S650 is executed after step S643 or step S648, a value coordinate transformed using the coordinate transformation formula recorded in the RAM 122 would be used as the point cloud data of the local periphery information 122B. That is, in a case where step S650 is executed after affirmative determination made in step S643, the coordinate transformation formula calculated in previously executed step S653 is used. In contrast, in a case where step S650 is executed after step S648, a coordinate transformation formula stored in step S648 is used. Next, the processing proceeds to step S651.

In step S651, the coordinate transformation formula is altered to minimize the error of the corresponding points. For example, the coordinate transformation formula is altered to minimize the sum of the indices of the distances between the points associated in step S650. The sum of the absolute values of the distances can be adopted as the sum of the indices of the distances between the associated points. The subsequent step S652 judges whether the error has converged. In a case where it is judged that the error has converged, the processing proceeds to step S653. In a case where it is judged that the error has not converged, the processing returns to step S650. The subsequent step S653 stores the coordinate transformation formula most lately altered in step S651 in the RAM 122, and the processing proceeds to step S654.

In step S654, the outlier list 122A is updated as follows. First, the existing outlier list 122A stored in the RAM 122 is cleared. Next, the point cloud of the local periphery information 122B is transformed into a parking lot coordinate system using the coordinate transformation formula recorded in step 653, and then, operation is performed to calculate a distance between each of points constituting the local periphery information 122B and a point constituting the corresponding parking lot point cloud 124A, namely, the Euclidean distance. In a case where the calculated distance is longer than a predetermined distance, the point of the local periphery information 122B is added to the outlier list 122A. Note that being spatially located at an end portion at this time may be defined as another condition to be added to the outlier list 122A. A spatial end portion is a point having a long distance to another point, such as a point acquired at the start of recording. The above processing is performed to update the outlier list 122A. This concludes the flowchart of FIG. 6.

Figure 7:
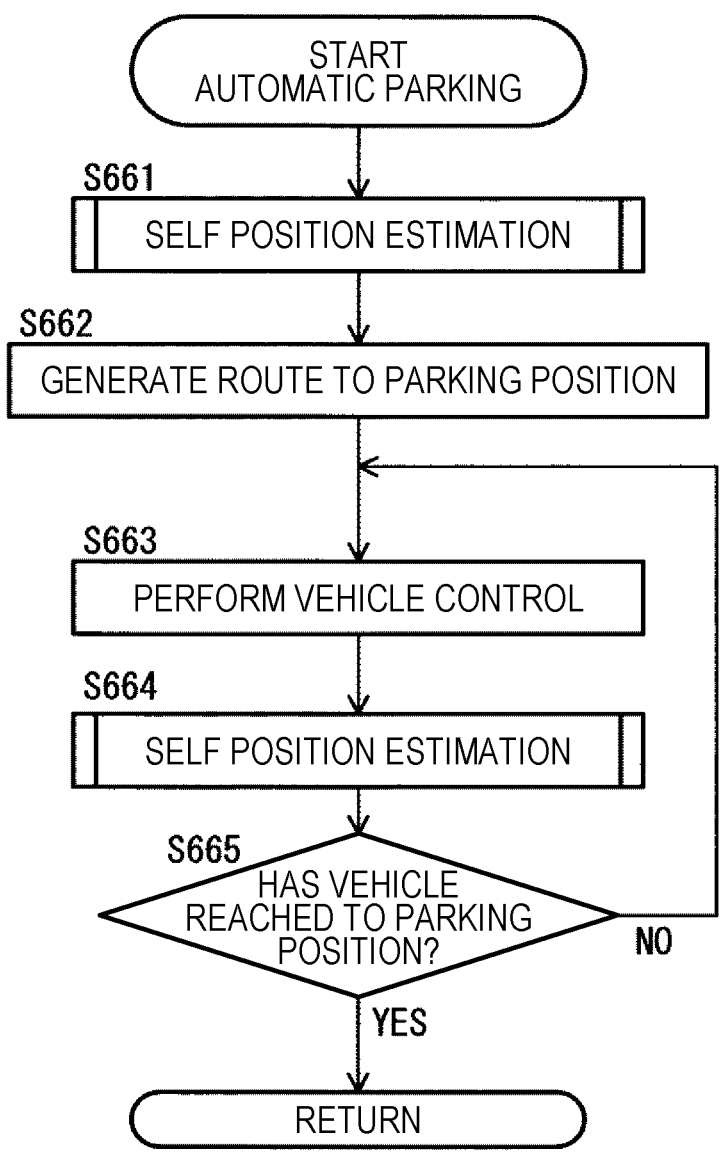
FIG. 7 is a flowchart illustrating automatic parking processing in the automatic parking phase.

Details of the automatic parking processing executed in step S608 in FIG. 4 will be described with reference to FIG. 7. The execution subject of individual steps described below is the in-vehicle processing apparatus 120.

Step S661 estimates the position of the vehicle 1 in the parking lot coordinate system. The processing in this step is similar to the step S604 in FIG. 4, so the description will be omitted. The subsequent step S662 generates a travel route from the position estimated in step S661 to the parking position stored in the parking lot point cloud 124A using a known route generation method. Next, the processing proceeds to step S663.

Step S663 controls the steering apparatus 131, the driving apparatus 132, and the braking apparatus 133 via the vehicle control apparatus 130 to move and the vehicle 1 to the parking position along the route generated in step S662. Alternatively, it is also allowable to output an operation command to the driving apparatus 132 in a limited duration in which the automatic parking button 110C is continuously pressed by the user. Furthermore, upon extraction of a person, a moving vehicle, or the like from the photographed image of the camera 102, the braking apparatus 133 is operated to stop the vehicle 1. The subsequent step S664 estimates the position of the vehicle 1 similarly to step S661. The subsequent step S665 judges whether the parking has been completed, that is, whether the vehicle 1 has reached the parking position. In a case where it is judged that the parking has not been completed, the processing returns to the step S663. In a case where it is judged that the parking has been completed, the flowchart of FIG. 7 ends.

Operation Example

Specific operation of the recording phase and the automatic parking phase will be described with reference to FIGS. 8 to 13.

FIG. 8(a) is a plan view illustrating an example of a parking lot 901. The parking lot 901 is provided in the vicinity of a building 902. The parking lot 901 has one gateway in a lower left of the drawing. Squares illustrated in FIG. 8(a) represent parking frames indicated in road surface paint, and a hatched parking frame 903 indicates a parking region of the vehicle 1 (region to be a parking position at completion of parking). In the present operation example, description follows assuming that the parking frame line alone is defined as a landmark. In this operation example, as illustrated in FIG. 8(a), the vehicle is represented by a triangle, and the sharpest acute angle of the triangle indicates a traveling direction of the vehicle 1.

Operation Example—Recording Phase Part 1

When the user presses the recording start button 110A near the entrance of the parking lot 901, the in-vehicle processing apparatus 120 starts landmark positioning and records the coordinates of the points constituting the parking frame line (step S501 in FIG. 3: YES, S502 to S504). Thereafter, the processing of steps S502 to S504 in FIG. 3 is repeated until the vehicle 1 recording completion button 110B is pressed.

FIG. 8(*b*) is a diagram visualizing the point cloud of the landmark stored in the RAM 122. In FIG. 8(*b*), a solid line represents a point cloud of landmarks stored in the RAM 122, while a broken line represents a landmark not stored in the RAM 122. Since a photographable region of the camera 102 of the vehicle 1 is limited, parking frame lines near the entrance of the parking lot 901 alone are recorded when the vehicle 1 is near the entrance of the parking lot 901, as illustrated in FIG. 8(*b*). When the user moves on the vehicle 1 to an inner position of the parking lot 901, the in-vehicle processing apparatus 120 can record the point cloud of the entire landmarks of the parking lot 901.

When the user stops the vehicle 1 in the parking frame 903 and presses the recording completion button 110B, the in-vehicle processing apparatus 120 acquires the latitude/longitude of the vehicle 1 from the GPS receiver 107 and records the coordinates of four corners of the vehicle 1 (step S505: YES, S505A). In a case where the latitude/longitude substantially in agreement with the current latitude/longitude of the vehicle 1 has not been recorded in the parking lot point cloud 124A (S506: NO), the point cloud stored in the RAM 122 is stored as new data constituting the parking lot point cloud 124A, that is, as new parking lot data.

Operation Example—Recording Phase Part 2

Another example will be described as a case where point cloud data illustrated in FIG. 9(*a*) is recorded as parking lot data of the parking lot point cloud 124A and new point cloud data illustrated in FIG. 9(*b*) has been acquired. The point cloud data illustrated in FIG. 9(*a*) is point cloud data acquired as a result of traveling slightly along the right side from the entrance of the parking lot 901 illustrated in FIG. 8(*a*) to reach the parking position. As a result of traveling slightly along the right side compared with the case of FIG. 8(*a*), the point cloud data of the parking frame indicated in the dotted line in FIG. 9(*a*) has not been acquired.

The point cloud data illustrated in FIG. 9(*b*) is point cloud data acquired as a result of traveling slightly along the left side from the entrance of the parking lot 901 to reach the parking position. As a result of traveling slightly along the left side compared with the case of FIG. 8(*a*), the point cloud data of the parking frame indicated in the dotted line in FIG. 9(*b*) has not been acquired. Furthermore, the point cloud data illustrated in FIG. 9(*b*) is recorded as data in which the parking lot 901 is positioned diagonally compared with the case of FIG. 9(*a*) due to the orientation of the vehicle 1 not directly facing the parking lot 901 when the user pressed the recording start button 110A.

In a case where it is judged that the latitude/longitude substantially in agreement with the current latitude/longitude of the vehicle 1 is recorded in the parking lot point cloud 124A (S506: YES) when the user presses the recording completion button 110B in this state, coordinate transformation is performed with reference to the parking position, namely, the parking frame 903 in FIG. 9(*a*) and FIG. 9(*b*) (step S507). Subsequently, when the point cloud agreement rate IB is calculated (step S507A) and it is judged that the point cloud agreement rate IB is higher than a predetermined threshold (step S508: YES), point cloud data illustrated in FIG. 9(*b*) is integrated to the point cloud data illustrated in FIG. 9(*a*) (step S509). With this integration, the point cloud of the parking frame line on the left side not recorded in FIG. 9(*a*) is newly recorded, and the point clouds constituting the parking frame line on the right side in the figure and the upper part of the drawing are recorded in higher density.

Operation Example—Execution Phase

An example of matching processing in an execution phase will be described. In this operation example, point cloud data corresponding to the while of the parking lot 901 illustrated in FIG. 8(*a*) is stored in the parking lot point cloud 124A beforehand.

FIG. 10 is a diagram illustrating the current position of the vehicle 1 in the parking lot 901 illustrated in FIG. 8(*a*). The vehicle 1 faces upward in the drawing. FIGS. 11 to 12 illustrate parking frame lines of portions circled by the broken line in FIG. 10 being a front region of the vehicle 1.

FIG. 11 is a diagram illustrating data obtained by transforming the point cloud extracted from the image photographed by the vehicle 1 at a position illustrated in FIG. 10 into parking lot coordinates. That is, the point cloud illustrated in FIG. 11 is a point cloud detected from the most recently photographed image among the local periphery information 122B and corresponding to the data processed in step S641A in FIG. 6. The point cloud in FIG. 11, however, is represented by broken lines instead of points. In addition, FIG. 11 also displays the vehicle 1 for comparison with FIG. 10. As illustrated in FIG. 11, the point cloud data of the parking frame line exists on the left side of the vehicle 1 continuously, while the point cloud data of the parking frame line exists on the front side alone, on the right side of the vehicle 1.

FIG. 12 is a diagram illustrating a comparison between the parking lot point cloud 124A and local periphery information 122B illustrated in FIG. 11 in a case where the position estimation of the vehicle 1 in the parking lot coordinate system includes an error. In FIG. 12, the previous position estimation is shifted by substantially one width portion of the parking frame, causing a shift in the local periphery information 122B existing on the right side of the vehicle 1 from the parking lot point cloud 124A. In a case where the instantaneous agreement level IC is calculated in this state (step S642 in FIG. 6), the instantaneous agreement level IC indicates a low value due to the above-described shift on the right side of the vehicle 1. When this value is judged to be lower than a threshold (step S643: NO), the parking frame is detected as a periodic feature (steps S644, S645: YES), the width of the parking frame is calculated from the parking lot point cloud 124A (step S646), and then, the local periphery information 122B is moved by an integer multiple of the width of the parking frame to calculate the overall agreement level IW (step S647).

FIGS. 13(*a*) to 13(*c*) are diagrams illustrating a relationship of the local periphery information 122B illustrated in FIG. 13 with respect to the parking lot point cloud 124A in a case where the local periphery information 122B is moved by an integer multiple of a width of a parking frame. The local periphery information 122B illustrated in FIG. 13 moves upward in the drawing by +1, 0 and −1 times the width of the parking frame respectively in FIGS. 13(*a*) to 13(*c*). In FIG. 13(*a*), the local periphery information 122B has moved by one width portion of the parking frame to the upper side of the drawing, leading to an increased in the shift between the local periphery information 122B and the parking lot point cloud 124A. Accordingly, the overall agreement level IW in FIG. 13(*a*) is lower than the case involving no movement. In FIG. 13(*b*), the local periphery information 122B has not moved, and the local periphery information 122B and the parking lot point cloud 124A are shifted by one width portion of the parking frame as illustrated in FIG. 12. In FIG. 13(*c*), the local periphery information 122B has moved by one width portion of the parking frame to the lower side in the drawing, leading to substantial agreement between the local periphery information 122B and the parking lot point cloud 124A. Accordingly, the overall agreement level IW in FIG. 13(*c*) is higher than the case involving no movement.

Since the moving amount of the local periphery information 122B and the increase/decrease of the overall agreement level IW have the above relationship, the overall agreement level IW corresponding to FIG. 13(*c*) is judged to be the highest among the examples illustrated in FIG. 13, and then, a coordinate transformation formula corresponding to this movement is to be stored in the RAM 122 (step S648). In this manner, the in-vehicle processing apparatus 120 improves the estimated position accuracy.

According to the above-described first embodiment, the following operational effects can be obtained.

(1) The in-vehicle processing apparatus 120 includes: a storage unit 124 that stores point cloud data (parking lot point cloud 124A) including a plurality of coordinates of a point representing a portion of an object in a first coordinate system (parking lot coordinate system); a sensor input unit (interface 125) that acquires an output of a camera 102 that acquires information regarding vicinity of a vehicle 1; a movement information acquisition unit (interface 125) that acquires information related to movement of the vehicle 1; a local periphery information creation unit 121B that generates local periphery information 122B including the position of the vehicle in a second coordinate system (local coordinate system) and a plurality of coordinates of a point representing a portion of an object in the second coordinate system (local coordinate system) on the basis of information acquired by the sensor input unit and the movement information acquisition unit; and a position estimation unit 121C that estimates a relationship between the parking lot coordinate system and the local coordinate system on the basis of the parking lot point cloud 124A and the local periphery information 122B and then estimates the position of the vehicle 1 in the first coordinate system.

The in-vehicle processing apparatus 120 estimates the coordinate transformation formula of the parking lot coordinate system and the local coordinate system on the basis of the parking lot point cloud 124A and the local periphery information 122B, and then estimates the position of the vehicle 1 in the parking lot coordinate system. The parking lot point cloud 124A is information stored in the storage unit 124 beforehand, and the local periphery information 122B is generated from outputs of the camera 102, the vehicle speed sensor 108, and the steering angle sensor 109. That is, the in-vehicle processing apparatus 120 can acquire information regarding a point cloud in a coordinate system different from the coordinate system of the recorded point cloud, and can calculate the position of the vehicle 1 in the recorded coordinate system on the basis of the correspondence relationship between different coordinate systems. In addition, the in-vehicle processing apparatus 120 estimates the coordinate transformation formulas of the parking lot coordinate system and the local coordinate system on the basis of the parking lot point cloud 124A and the local periphery information 122B, leading to suppression of influence of noise even when the noise is included in a portion of the point cloud data of the local periphery information 122B. That is, the position estimation of the vehicle 1 using the in-vehicle processing apparatus 120 is resistant to disturbance.

(2) The position estimation unit 121C searches for points corresponding to the individual points constituting the local periphery information 122B from among the point cloud data (step S650 in FIG. 6), and estimates the coordinate transformation formula for the first coordinate system and the second coordinate system (step S651 in FIG. 6) to minimize the distance between the corresponding points.

(3) The position estimation unit 121C excludes point data of the local periphery information in which the distance between the point constituting the point cloud data or the local periphery information 122B and a point corresponding to this point is longer than a predetermined threshold, that is, applies the outlier list 122A (steps S641 and S653 in FIG. 6) to perform search and estimation. Therefore, it is possible to exclude the point cloud data separated far away from each other and that can be determined as a noise component from the calculation object, leading to enhancement of the accuracy of the coordinate transformation formula.

(4) Point cloud data and points included in local periphery information are expressed as coordinates in two-dimensional space. The position estimation unit 121C performs search and estimation excluding a point in which a distance between corresponding points is longer than a predetermined threshold and which is spatially located at an end portion of the local periphery information 122B.

The point cloud stored in the parking lot data of the parking lot point cloud 124A is related to a landmark closer to the parking position than a point at which the user pressed the recording start button 110A. If the operation of the flowchart illustrated in FIG. 4 is started at a point farther from the parking region than the point, a point that does not correspond to any point stored in the parking lot data might be included in the local periphery information 122B. In a case where ICP, that is, the processing of steps S650 to S652 in FIG. 6 is performed to include this point, it is difficult to acquire an appropriate solution. Therefore, these steps are to be excluded to acquire appropriate solution.

(5) The point cloud data includes a periodic feature.

After estimating the coordinate transformation formula for the first coordinate system and the second coordinate system, the position estimation unit 121C corrects the coordinate transformation formula for the first coordinate system and the second coordinate system (steps S646 to S648 in FIG. 6) on the basis of the distance of one period of a periodic feature so as to reduce the distance between the corresponding points.

In general, when a periodic feature is included in point cloud data, matching tends to be achieved with an integer multiple of the distance corresponding to that period. Once such shifted matching is achieved, it is difficult to achieve matching to a correct position due to the nature of iterative processing. Accordingly, the solution to this problem is shifting using an integer multiple of the period after conversion of the solution of the iterative processing. In other words, with consideration of the possibility of falling into a local solution that is shifted by several periods of the periodic feature from the global solution in repeated calculation, it is possible to acquire a global solution or a local solution closer to the global solution with several periods of shift with respect to the above periods.

Figure 6:
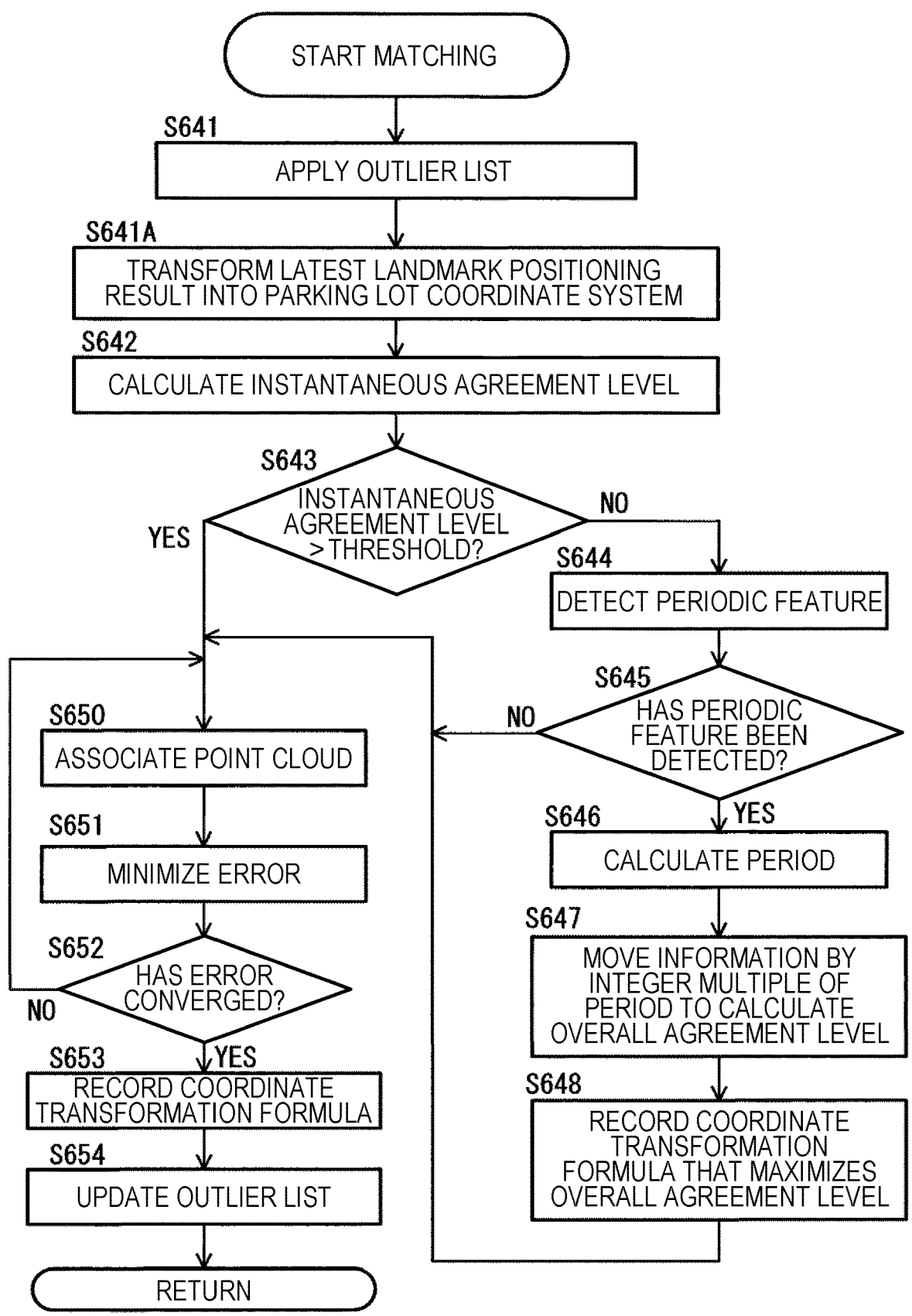
FIG. 6 is a flowchart illustrating matching processing in the automatic parking phase.

(6) The position estimation unit performs the correction in a case where an instantaneous agreement level IC being an index of an agreement level between the local periphery information in the first coordinate system created on the basis of: a previously estimated position of the vehicle in the first coordinate system; most recent information acquired by the sensor input unit; and most recent information acquired by the movement information acquisition unit, and the point cloud data in the first coordinate system, is smaller than a predetermined threshold (steps S641A to S643 in FIG. 6). Accordingly, the processing of steps S644 to S648 in FIG. 6 is executed only when it is judged to be necessary in consideration of necessity of the processing rather than being executed constantly.

(7) The in-vehicle processing apparatus 120 includes the point cloud data acquisition unit 121A that creates second point cloud data including a plurality of coordinates of a point representing a portion of an object excluding a moving body in a third coordinate system (recording coordinate system) on the basis of information acquired by the sensor input unit and the movement information acquisition unit and then stores the created second point cloud data in the storage unit 124 as the parking lot point cloud 124A. This enables the in-vehicle processing apparatus 120 to create the parking lot point cloud 124A at the time of travel of the vehicle 1 mounting the in-vehicle processing apparatus 120. The processing of creating the parking lot point cloud 124A and the position estimation processing of the vehicle 1 shares a method of landmark positioning, and thus, are able to share a program module between individual processing.

(8) The third coordinate system (recording coordinate system) is set on the basis of the position and attitude of the vehicle at the start of creation of the second point cloud data. After acquisition of a plurality of pieces of second point cloud data having different coordinate systems due to difference in the position or attitude of the vehicle at the time of starting the creation of the second point cloud data, the point cloud data acquisition unit 121A estimates a relationship between the different coordinate systems with reference to the parking position of the vehicle 1 and integrates the plurality of pieces of second point cloud data (steps S507 and S509 in FIG. 3). Therefore, even when different recording coordinate systems are set each time the point cloud data is acquired, it is possible to integrate the plurality of pieces of point cloud data. This stems from a focus on the point that the vehicle 1 is parked at the same parking position while the position of starting acquisition of point cloud data and the attitude of the vehicle 1 at that time are different.

(9) The in-vehicle processing apparatus 120 includes: a vehicle control apparatus 130 that drives the vehicle on the basis of the output of the position estimation unit 121C and moves the vehicle to a predesignated parking position in the first coordinate system; and a position information acquisition unit (interface 125) that acquires the latitude/longitude of the vehicle 1 from the GPS receiver 107 that receives the information (latitude and longitude) related to the position of the vehicle 1. The points constituting the parking lot point cloud 124A are points representing a portion of the components of the parking lot. The storage unit 124 also stores the latitude/longitude of a parking lot constituted with stationary objects of point cloud data. The in-vehicle processing apparatus 120 further includes a control unit, namely, the calculation unit 121 that moves the vehicle 1 to the parking position using the vehicle control apparatus 130 in a case where the difference in distance between the position measured by the GPS receiver 107 and the position of the parking lot is shorter than a predetermined distance. This enables the in-vehicle processing apparatus 120 to automatically park the vehicle 1 to the parking position included in the parking lot point cloud 124A, with a distant position where any of the sensors mounted on the vehicle 1 cannot directly observe the parking position as a starting point.

The first embodiment described above may be modified as follows.

(1) The in-vehicle processing apparatus 120 may be connected to a plurality of cameras. With the use of images photographed by the plurality of cameras, the in-vehicle processing apparatus 120 can extract a point cloud from a wide range of landmarks existing in the periphery of the vehicle 1.

(2) The in-vehicle processing apparatus 120 need not receive a result of sensing from the vehicle speed sensor 108 and the steering angle sensor 109. In this case, the in-vehicle processing apparatus 120 estimates the movement of the vehicle 1 using the image photographed by the camera 102. The in-vehicle processing apparatus 120 calculates a positional relationship between a subject and the camera 102 using the internal parameters and the external parameters stored in the ROM 123. Thereafter, the subject is tracked in a plurality of photographed images to estimate the moving amount and the movement direction of the vehicle 1.

(3) Point cloud information such as the parking lot point cloud 124A and the local periphery information 122B may be stored as three-dimensional information. Three-dimensional point cloud information may be projected on a two-dimensional plane for comparison with another point cloud in two dimensions similarly to the first embodiment, or may be mutually compared in three dimensions. In this case, the in-vehicle processing apparatus 120 can acquire a three-dimensional point cloud of landmarks as follows. That is, it is possible to acquire a three-dimensional point cloud of a stationary solid object with the use of the moving amount of the vehicle 1 calculated on the basis of the outputs of the vehicle speed sensor 108 and the steering angle sensor 109 and with the use of the plurality of photographed images output from the camera 102 together with a known motion stereo technology and information acquired by correcting motion estimation portion using an internal field sensor and a positioning sensor.

(4) In step S643 of FIG. 6, the in-vehicle processing apparatus 120 may proceed to step S644 in a case where a negative determination is made several times in succession rather than proceeding to step S644 after a single negative determination.

(5) Instead of the judgment of step S643 in FIG. 6, the in-vehicle processing apparatus 120 may judge whether the ratio of the points judged to be outliers in the local periphery information 122B is larger than a predetermined threshold. In a case where the ratio is greater than the threshold, the processing proceeds to step S644. In a case where the ratio is the threshold or below, the processing proceeds to step S650. Furthermore, the in-vehicle processing apparatus 120 may be configured to proceed to step S644 only in the case where the above-described ratio is sufficiently great in addition to the judgment in step S643 in FIG. 6.

(6) The in-vehicle processing apparatus 120 may perform the processing in steps S644 and S646 in FIG. 6 beforehand. Furthermore, the processing result may be recorded in the storage unit 124.

(7) The in-vehicle processing apparatus 120 may receive an operation command from the user not only from the input apparatus 110 provided inside the vehicle 1 but also from the communication apparatus 114. For example, in response to user's operation on a portable terminal possessed by the user in communication between the portable terminal and the communication apparatus 114, the in-vehicle processing apparatus 120 may perform operation similar to the case where the automatic parking button 110C is pressed. In this case, the in-vehicle processing apparatus 120 can perform automatic parking not only when the user is inside the vehicle 1 but also after the user gets off the vehicle.

(8) The in-vehicle processing apparatus 120 may park not only at the parking position recorded in the parking lot point cloud 124A but also at the position designated by the user. The designation of the parking position by the user is performed, for example, with operation such that the in-vehicle processing apparatus 120 displays a candidate for a parking position on the display apparatus 111 and then the user selects any of the candidates using the input apparatus 110.

(9) The in-vehicle processing apparatus 120 may receive the parking lot point cloud 124A from outside via the communication apparatus 114, or may transmit the created parking lot point cloud 124A to the outside via the communication apparatus 114. In addition, another party with which the in-vehicle processing apparatus 120 exchanges the parking lot point cloud 124A may be another in-vehicle processing apparatus 120 mounted in another vehicle, or may be an apparatus managed by an organization managing the parking lot.

(10) The automatic parking system 100 may include a portable terminal instead of the GPS receiver 107, and may record identification information from a base station with which the portable terminal communicates instead of the latitude/longitude. This is because a communication range of a base station is limited to about several hundred meters, and thus, there is a high possibility of the same parking lot when the base stations conducting communication are the same.

(11) Periodic features included in parking lot data are not limited to parking frames. For example, a plurality of straight lines constituting a pedestrian crossing which is one of road surface paints are also periodic features. Moreover, in a case where parking lot data are constituted with information regarding obstacles such as walls acquired by laser radar or the like, regularly arranged pillars are also periodic features.

(12) In the above-described embodiment, vehicles or humans as moving bodies are not included in the landmarks. However, moving bodies may be included in landmarks. In that case, landmarks as moving bodies and landmarks other than moving bodies may be stored so as to be distinguishable from each other.

(13) In the recording phase, the in-vehicle processing apparatus 120 may identify detected landmarks and record identification results of the individual landmarks together with the parking lot point cloud 124A. Identification of landmarks uses shape information and color information regarding landmarks acquired from photographed images and solid shape information regarding landmarks by known motion stereo technology. Landmarks are identified as, for example, parking frames, road surface paint other than parking frames, curbstones, guardrails, walls, or the like. Furthermore, the in-vehicle processing apparatus 120 may include a vehicle or a human as a moving body in the landmark and may record a result of identification in the parking lot point cloud 124A similarly to other landmarks. In this case, the vehicle and human may be integrally identified and recorded as "moving bodies", or the vehicle and the human may be discriminated and recorded separately.

Second Embodiment

An in-vehicle processing apparatus according to a second embodiment of the present invention will be described with reference to FIGS. 14 to 16. In the following explanation, the same reference numerals are given to the same constituent elements as those of the first embodiment, and differences will mainly be described. Points that are not specifically described are the same as those of the first embodiment. The present embodiment is mainly different from the first embodiment in that it includes laser radar instead of a camera and acquires point cloud data of a stationary solid object.

Configuration

Figure 14:
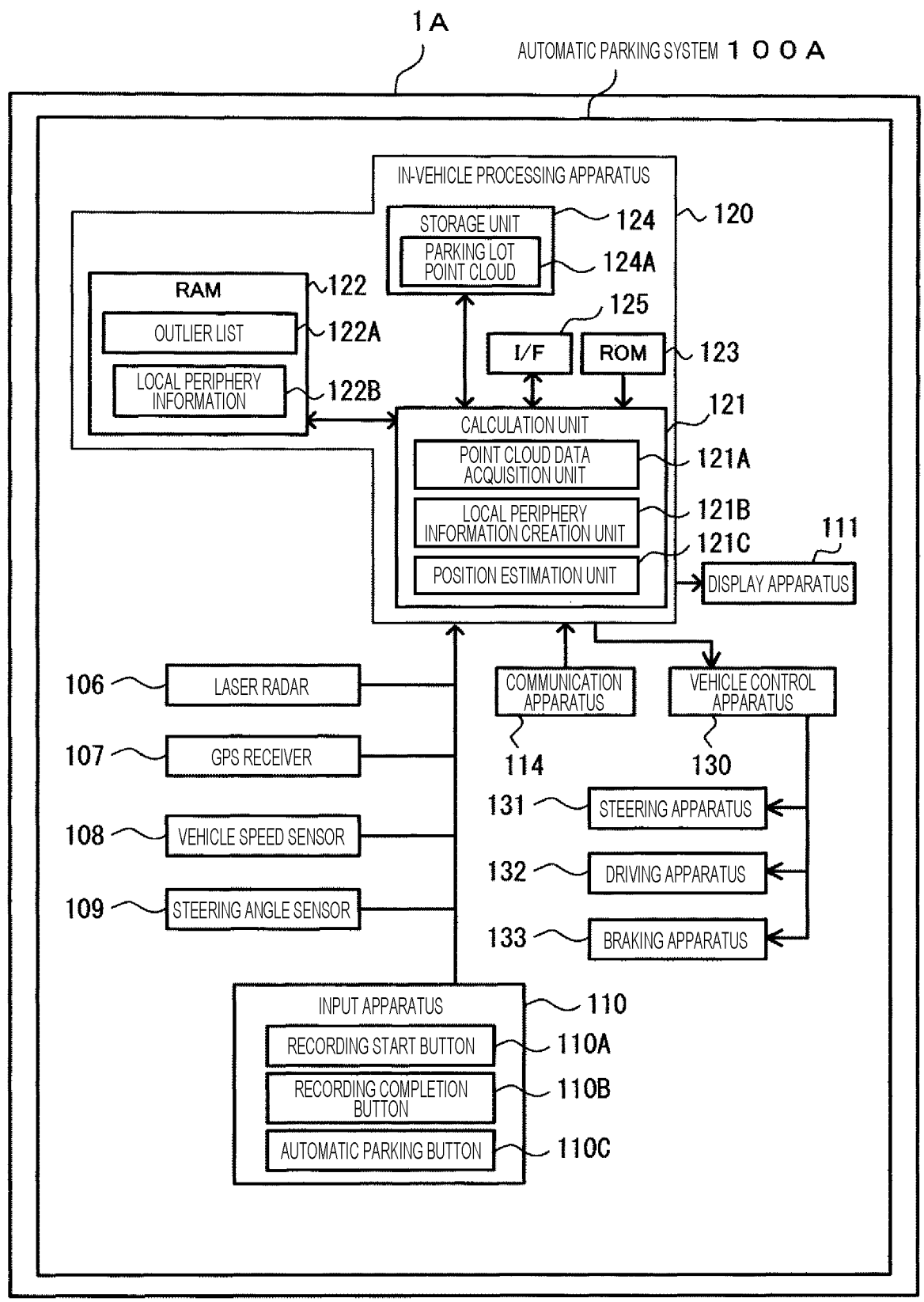
FIG. 14 is a configuration diagram of an automatic parking system 100A according to a second embodiment.

FIG. 14 is a configuration diagram of an automatic parking system 100A according to the second embodiment. The automatic parking system 100A has a configuration in which the camera 102 is excluded and laser radar 106 is added from/to the configuration of the automatic parking system 100 according to the first embodiment. The configuration of the in-vehicle processing apparatus 120 is similar to that of the first embodiment. The automatic parking system 100A is provided in a vehicle 1A. In the present embodiment, the shape of a stationary solid object is used as a landmark.

The laser radar 106 measures a distance to an object on the basis of the time from laser emission to observation of a reflected wave, and outputs the measured distance to the in-vehicle processing apparatus 120. Furthermore, three-dimensional information regarding the landmark can be acquired by changing an emission direction of the laser in the vertical direction and the horizontal direction.

Furthermore, the in-vehicle processing apparatus 120 can detect paint on the road surface on the basis of a difference in reflectance of substances.

With the use of the signal acquired from the laser radar 106, the in-vehicle processing apparatus 120 can recognize a human and a vehicle by two-dimensional or three-dimensional template matching and can exclude humans and vehicles in landmark positioning. Furthermore, in a case where a change rate of the distance to the object is not in agreement with the moving speed of the vehicle 1, the object may be judged to be a moving object and data related to the moving object may be excluded in the landmark positioning. Operation of the in-vehicle processing apparatus 120 is similar to that in the first embodiment.

Operation Example

Figure 15:
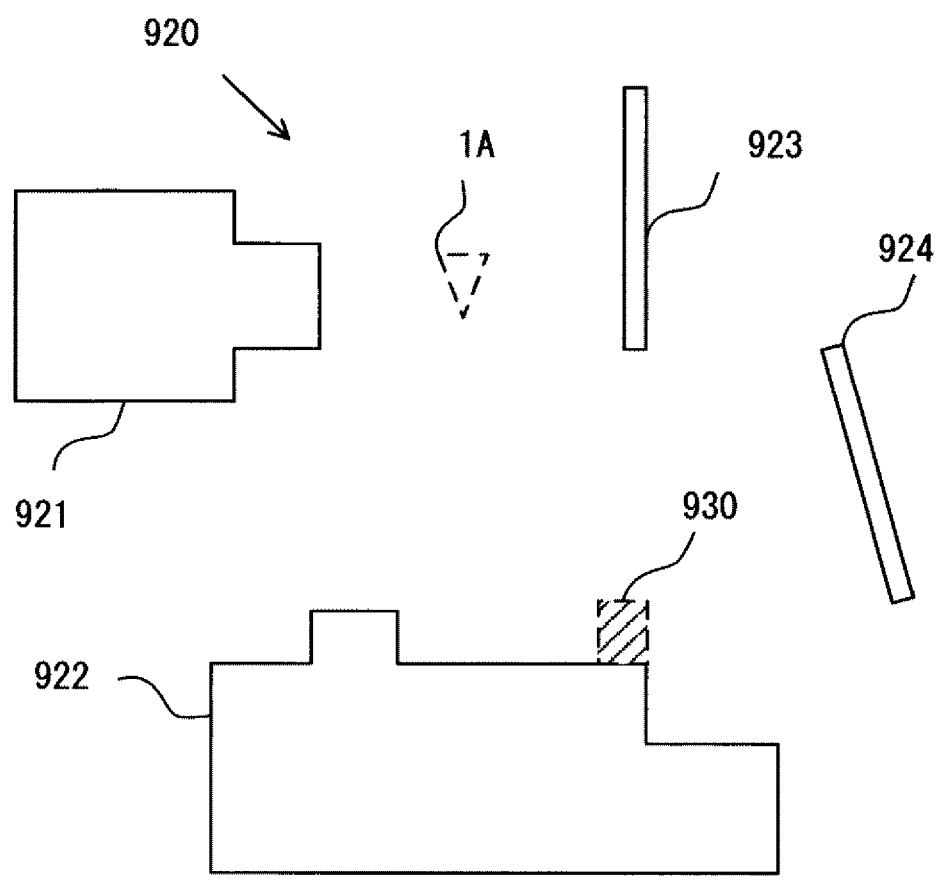
FIG. 15 is a diagram illustrating an example of a parking lot according to the second embodiment.

FIG. 15 is a diagram illustrating an example of a parking lot according to the second embodiment. A parking lot 920 is a region surrounded by a building 921 and a building 922 as stationary solid objects, a guardrail 923, and a guardrail 924. A parking region of the vehicle 1 in the parking lot 920 is a region indicated by reference numeral 930.

The storage unit 124 of the in-vehicle processing apparatus 120 stores parking lot data of the parking lot 920 acquired by the laser radar 106 on the vehicle 1A traveling in the recording phase beforehand, as the parking lot point cloud 124A. The vehicle 1A has travelled in the parking lot 920 a plurality of times in the recording phase, and dense point cloud data has been acquired by the above-described merging processing (step S509 in FIG. 3).

On this premise, when the vehicle 1A travels from the upper direction of FIG. 15 to the parking lot 920 and reaches the position indicated by the broken line in FIG. 15, the in-vehicle processing apparatus 120 acquires the point cloud data illustrated in FIG. 16(a) as the local periphery information 122B. Thereafter, the in-vehicle processing apparatus 120 performs matching processing to calculate the correspondence relationship between the local periphery information 122B and the parking lot point cloud 124A, that is, the coordinate transformation formula for the local coordinate system and the parking lot coordinate system and thus estimates the position of the vehicle 1A in the parking lot coordinate system. FIG. 16(b) is a diagram acquired by superimposing the local periphery information 122B illustrated in FIG. 16(a) on the point cloud of the parking lot point cloud 124A using the calculated coordinate transformation formula.

According to the above-described second embodiment, the following operational effects can be obtained in addition to the operational effects of the first embodiment.

That is, since the laser radar 106 can acquire information with a period shorter than that of the camera, the in-vehicle processing apparatus 120 can perform position estimation more frequently.

Modification of Second Embodiment

While the vehicle 1A includes the laser radar 106 in the second embodiment described above, ultrasonic radar may be provided in place of the laser radar 106. Ultrasonic radar can measure a distance to an obstacle similarly to the laser radar 106. Alternatively, the vehicle 1A may further include ultrasonic radar in addition to the laser radar 106.

Third Embodiment

An in-vehicle processing apparatus according to a third embodiment of the present invention will be described with reference to FIGS. 17 to 18. In the following explanation, the same reference numerals are given to the same constituent elements as those of the first embodiment, and differences will mainly be described. Points that are not specifically described are the same as those of the first embodiment. The present embodiment is different from the first embodiment mainly in that position estimation is performed using a bird's eye view image.

Configuration

Figure 17:
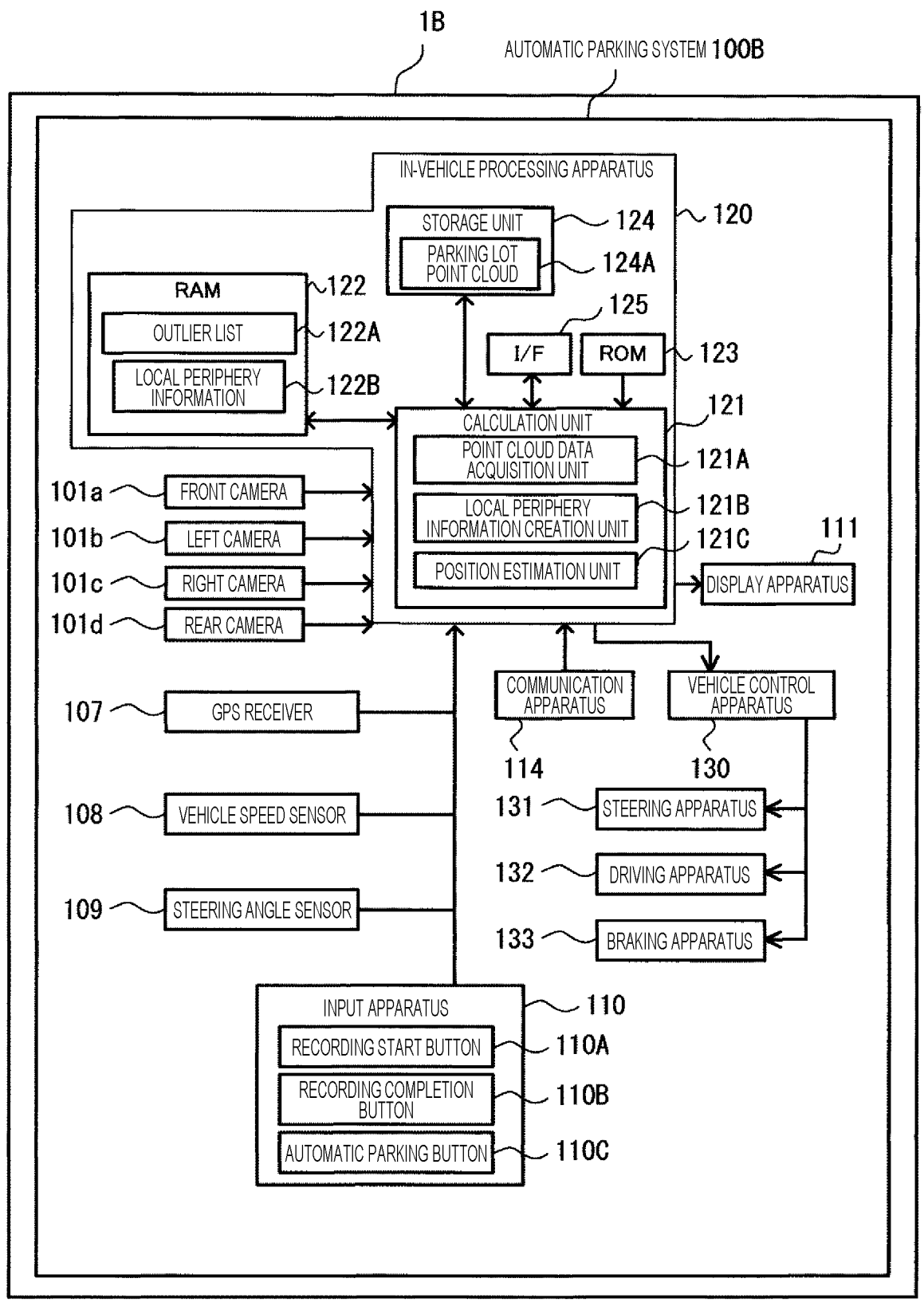
FIG. 17 is a configuration diagram of an automatic parking system 100B according to a third embodiment.

FIG. 17 is a configuration diagram of an automatic parking system 100B according to the third embodiment. The automatic parking system 100B is mounted on the vehicle 1B. The automatic parking system 100B includes three cameras added to the configuration of the automatic parking system 100 according to the first embodiment. Specifically, the automatic parking system 100B includes: a front camera 101a mounted in front of the vehicle 1B for photographing the front of the vehicle 1B; a left camera 101b mounted on the left side of the vehicle 1B for photographing the left side of the vehicle 1B; a right camera 101c mounted on the right side of the vehicle 1B for photographing the right side of the vehicle 1B; and a rear camera 101d mounted at rear of the vehicle 1B and photographing the rear side of the vehicle 1B. Hereinafter, the front camera 101a, the left camera 101b, the right camera 101c, and the rear camera 101d will be collectively referred to as the camera 101.

The configuration of the in-vehicle processing apparatus 120 is similar to that of the first embodiment. In the present embodiment, processing executed by the program stored in the ROM 123 is partly different. The storage unit 124 stores a continuous bird's eye view image to be described below as the parking lot point cloud 124A and the local periphery information 122B. The ROM 123 stores internal parameters and external parameters of the camera 101.

Landmark Positioning

Landmark positioning processing in the third embodiment includes creation of continuous bird's eye view images described below.

The in-vehicle processing apparatus 120 creates a bird's eye view image of the vehicle 1B viewed from directly above using viewpoint transformation processing on an image photographed by the camera 101. This viewpoint transformation processing uses internal parameters and external parameters. The in-vehicle processing apparatus 120 creates a first bird's eye view image using a photographed image photographed at a first point and creates a second bird's eye view image using a photographed image photographed at a second point. Then, the in-vehicle processing apparatus 120 combines the first bird's eye view image with the second bird's eye image on the basis of a positional relationship between the first point and the second point calculated from the outputs of the vehicle speed sensor 108 and the steering angle sensor 109. With this processing continuously performed with the movement of the vehicle 1B, a continuous bird's eye view image combining a large number of bird's eye view images is created.

The first bird's eye image and the second bird's eye image may be combined to always prioritize the bird's eye view image taken from the photographed image of recent photographing time, or may be combined to extract only bird's eye view images in a specific direction with respect to the vehicle 1B, for example, directions corresponding to the side direction or 45 degrees ahead.

Operation Example

Figure 18:
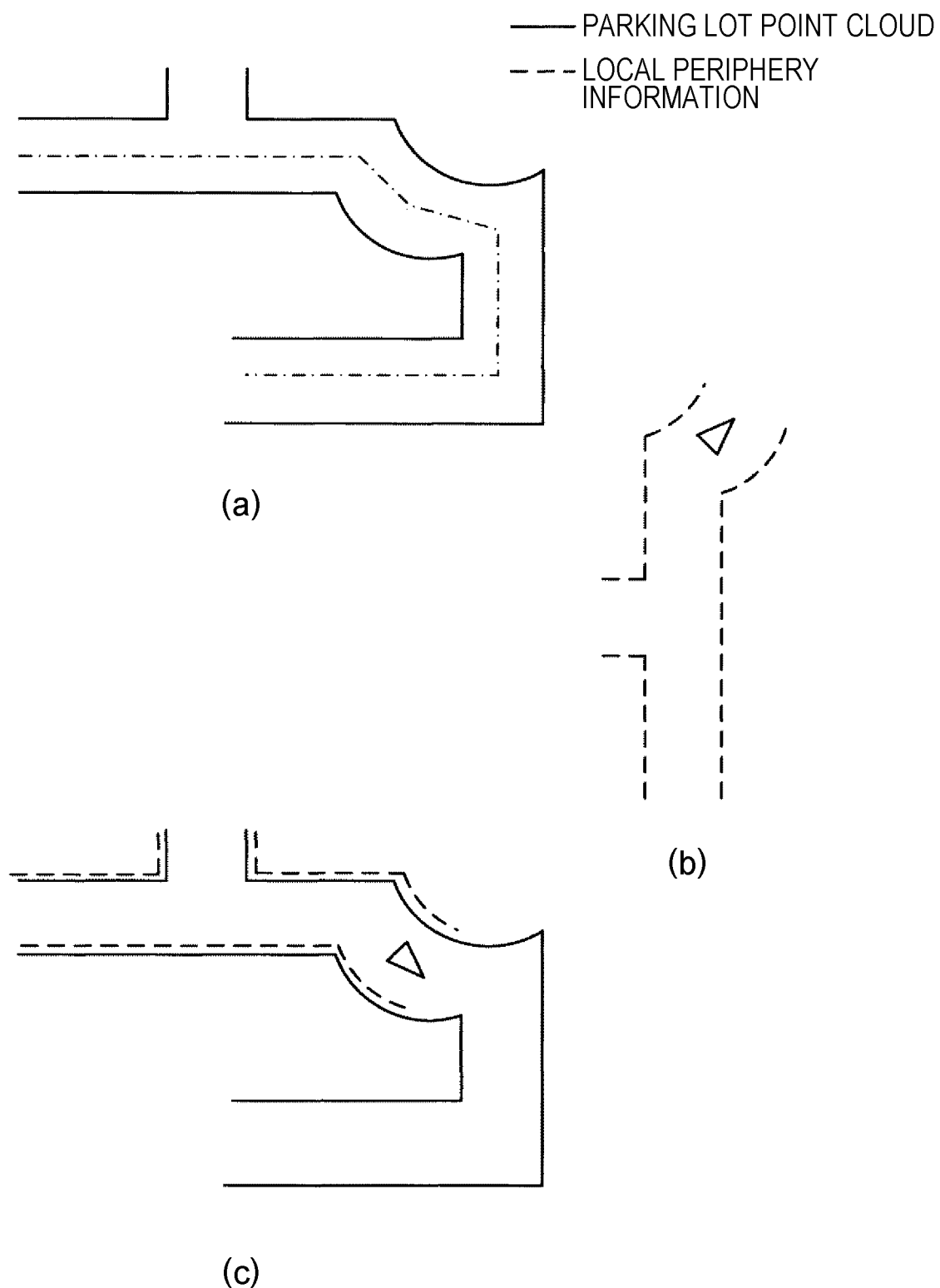
FIGS. 18A to 18C are diagrams illustrating operation examples according to the third embodiment.

FIG. 18(a) is a diagram illustrating a travel path of the vehicle 1B and a continuous bird's eye view image created by the in-vehicle processing apparatus 120. In FIG. 18, the vehicle 1B travels on a route indicated by a one-dot chain line from point A to point B to create a continuous bird's eye view image. When the in-vehicle processing apparatus 120 performs operation in the automatic parking phase in a case where this continuous bird's eye view image is stored as the parking lot point cloud 124A in the storage unit 124, the position of a map coordinate system is estimated as follows.

The in-vehicle processing apparatus 120 creates a continuous bird's eye view image on the basis of outputs from the camera 101, the vehicle speed sensor 108, and the steering angle sensor 109, and stores the continuous bird's eye view image in the RAM 122 as local periphery information 122B. The in-vehicle processing apparatus 120 acquires the continuous bird's eye view image illustrated in FIG. 18(b), that is, the local periphery information 122B when the vehicle 1B has travelled to a certain point. The in-vehicle processing apparatus 120 performs matching processing to calculate a correspondence relationship between the local periphery information 122B and the parking lot point cloud 124A, that is, a coordinate transformation formula for a local coordinate system and a parking lot coordinate system. With this calculation, the position of the vehicle 1A in the parking lot coordinate system is estimated as illustrated in FIG. 18(c).

According to the above-described third embodiment, the following operational effects can be obtained in addition to the operational effects of the first embodiment. That is, since the parking lot point cloud 124A and the local periphery information 122B are composed of photographed images of the camera 101, it is easy for the user to confirm the position.

First Modification of Third Embodiment

In the third embodiment, viewpoint transformation processing is performed on the photographed image to create a bird's eye view image. Alternatively, however, it is also allowable to extract feature points from the photographed image, perform viewpoint transformation processing on the extracted feature points alone to create a bird's eye view image. In this case, the continuous bird's eye view image is composed only of the feature points.

Each of the embodiments and modifications described above may be combined with each other.

While various embodiments and modifications have been described above, the present invention is not limited to these examples. Other aspects conceivable within the technical scope of the present invention are also included within the scope of the present invention.

REFERENCE SIGNS LIST

1, 1A, 1B vehicle
100, 100A, 100B automatic parking system
102 camera
107 GPS receiver
108 vehicle speed sensor
109 steering angle sensor
120 in-vehicle processing apparatus
121 calculation unit
121A point cloud data acquisition unit
121B local periphery information creation unit
121C position estimation unit
122A outlier list
122B local periphery information
124 storage unit
124A parking lot point cloud
125 interface
130 vehicle control apparatus
IB point cloud agreement rate
IC instantaneous agreement level
IW overall agreement level

The invention claimed is:

1. An in-vehicle processing apparatus comprising:
   a storage unit that stores point cloud data including a plurality of coordinates of a point representing a portion of an object in an actual latitude and longitude coordinate system, wherein the actual latitude and longitude indicate a parking region and coordinates of points constituting a landmark existing in a parking lot;
   a sensor input unit that acquires an output of a sensor that acquires information regarding vicinity of a vehicle;
   a movement information acquisition unit that acquires information related to movement of the vehicle;
   a local periphery information creation unit that generates local periphery information including a current position of the vehicle in a coordinate system where the current position is set as an origin and a plurality of coordinates of a point representing a portion of an object in the coordinate system where the current position is set as an origin on the basis of information acquired by the sensor input unit and the movement information acquisition unit; and
   a position estimation unit that estimates a relationship between the actual latitude and longitude coordinate system and the coordinate system where the current position is set as an origin by applying an outlier list to the local periphery information and excluding from processing part of the outlier list, and then estimates the current position of the vehicle in the actual latitude and longitude coordinate system, wherein
   the position estimation unit searches for points corresponding to individual points constituting the local periphery information from among the point cloud data, and estimates a coordinate transformation formula for the actual latitude and longitude coordinate system and the coordinate system where the current position is set as an origin to minimize a distance between the corresponding points, and
   the position estimation unit excludes point data of the local periphery information in which a distance between the point constituting the point cloud data or the local periphery information and a point corresponding to this point is longer than a predetermined threshold, and performs the search and the estimation.

2. The in-vehicle processing apparatus according to claim 1,
   wherein points included in the point cloud data and in the local periphery information are expressed as coordinates in a two-dimensional space or coordinates in a three-dimensional space, and
   the position estimation unit performs the search and the estimation excluding a point in which the distance between the corresponding points is longer than a predetermined threshold and which is spatially located at an end portion of the local periphery information.

3. The in-vehicle processing apparatus according to claim 1,
   wherein the point cloud data includes a periodic feature, and
   the position estimation unit estimates a coordinate transformation formula for the actual latitude and longitude coordinate system and the coordinate system where the current position is set as an origin and thereafter corrects a coordinate transformation formula for the actual latitude and longitude coordinate system and the coordinate system where the current position is set as an origin on the basis of a distance corresponding to one period of the periodic feature so as to reduce the distance between the corresponding points.

4. The in-vehicle processing apparatus according to claim 3,
   wherein the position estimation unit performs the correction in a case where an instantaneous agreement level being an index of an agreement level between the local periphery information in the actual latitude and longitude coordinate system created on the basis of: a previously estimated position of the vehicle in the actual latitude and longitude coordinate system; most recent information acquired by the sensor input unit; and most recent information acquired by the movement information acquisition unit, and the point cloud data in the actual latitude and longitude coordinate system, is smaller than a predetermined threshold.

5. The in-vehicle processing apparatus according to claim 1, further comprising
a point cloud data acquisition unit that creates second point cloud data including a plurality of coordinates of a point representing a portion of an object excluding a moving body in a third coordinate system on the basis of information acquired by the sensor input unit and the movement information acquisition unit and stores the created second point cloud data in the storage unit.

6. The in-vehicle processing apparatus according to claim 5,
wherein the third coordinate system is set on the basis of a position and attitude of the vehicle at the time of starting creation of the second point cloud data, and
after acquisition of a plurality of pieces of the second point cloud data having different coordinate systems due to differences in the position or the attitude of the vehicle at the start of creation of the second point cloud data, the point cloud data acquisition unit estimates a relationship between the different coordinate systems on the basis of a parking position of the vehicle and integrates the plurality of pieces of second point cloud data.

7. The in-vehicle processing apparatus according to claim 1, further comprising:

a vehicle control unit that drives the vehicle on the basis of an output of the position estimation unit and moves the vehicle to a predesignated parking position in the actual latitude and longitude coordinate system; and
a position information acquisition unit that acquires information related to the position of the vehicle from a receiver that receives information related to the position of the vehicle,
wherein the point that constitutes the point cloud data is a point that represents a portion of a component of a parking lot,
the storage unit further stores the position of the parking lot constituted with a stationary object in the point cloud data, and
the in-vehicle processing apparatus further comprises a control unit that moves the vehicle to the parking position using the vehicle control unit in a case where a difference in distance between the position indicated by the information related to the position acquired by the position information acquisition unit and the position of the parking lot is shorter than a predetermined distance.

* * * * *